US009377856B2

(12) United States Patent
Ikemoto et al.

(10) Patent No.: US 9,377,856 B2
(45) Date of Patent: Jun. 28, 2016

(54) ELECTRONIC DEVICE INCLUDING INERTIAL FORCE SENSOR CAPABLE OF DETECTING MULTIPLE INERTIAL FORCES

(71) Applicant: Panasonic Corporation, Osaka (JP)

(72) Inventors: Koichi Ikemoto, Hyogo (JP); Yoshitaka Hirabayashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 93 days.

(21) Appl. No.: 14/363,705

(22) PCT Filed: Nov. 20, 2012

(86) PCT No.: PCT/JP2012/007443
§ 371 (c)(1),
(2) Date: Jun. 6, 2014

(87) PCT Pub. No.: WO2013/084428
PCT Pub. Date: Jun. 13, 2013

(65) Prior Publication Data
US 2014/0366130 A1    Dec. 11, 2014

(30) Foreign Application Priority Data
Dec. 9, 2011   (JP) .................................. 2011-269704

(51) Int. Cl.
G06F 3/16   (2006.01)
G06F 3/01   (2006.01)
(Continued)

(52) U.S. Cl.
CPC .............. *G06F 3/016* (2013.01); *G06F 1/1694* (2013.01); *G06F 3/017* (2013.01); *G06F 3/0346* (2013.01);
(Continued)

(58) Field of Classification Search
CPC ........................................................ G06F 3/16
USPC ........................................................... 726/19
See application file for complete search history.

(56) References Cited

U.S. PATENT DOCUMENTS

2012/0028710 A1   2/2012   Furukawa et al.

FOREIGN PATENT DOCUMENTS

JP   07-160880 A   6/1995
JP   2003-296782 A  10/2003
(Continued)

OTHER PUBLICATIONS

International Search Report for Application No. PCT/JP2012/007443 dated Feb. 12, 2013.

*Primary Examiner* — Jacob Lipman
(74) *Attorney, Agent, or Firm* — Pearne & Gordon LLP

(57) ABSTRACT

An electronic device includes an inertial force sensor, a memory unit, and a control unit connected to the inertial force sensor and the memory unit. The control unit includes a characteristic-waveform processor and an authenticator. The characteristic-waveform processor is operable to generate a characteristic waveform based on output waveforms output from the inertial force sensor in response to operations performed by a first user, and to record the characteristic waveform in the memory unit. The authenticator is operable to generate a reference waveform based on one or more output waveforms output from the inertial force sensor in response to respective ones of one or more operations performed by a second user, and to determine whether or not the first user and the second user are identical to each other by comparing the reference waveform with the characteristic waveform. This electronic device performs accurate authentication with a simple structure.

14 Claims, 21 Drawing Sheets

(51) Int. Cl.
*G06F 21/31* (2013.01)
*G06F 21/32* (2013.01)
*G06F 1/16* (2006.01)
*G06F 3/0346* (2013.01)
*H04M 1/67* (2006.01)

(52) U.S. Cl.
CPC ............. *G06F 21/31* (2013.01); *G06F 21/316* (2013.01); *G06F 21/32* (2013.01); *G06F 2200/1637* (2013.01); *H04M 1/67* (2013.01); *H04M 2250/12* (2013.01)

(56) References Cited

FOREIGN PATENT DOCUMENTS

| | | | |
|---|---|---|---|
| JP | 2007-193656 A | | 8/2007 |
| JP | 2007307301 A | * | 11/2007 |
| JP | 2010-257247 A | | 11/2010 |
| JP | 2011-227569 A | | 11/2011 |

* cited by examiner

|  |  | Threhsold |
|---|---|---|
| Angular Velocity | X Axis | Tyx=50 |
|  | Y Axis | Tyy=30 |
|  | Z Axis | Tyz=40 |
| Acceleration | X Axis | Tgx=40 |
|  | Y Axis | Tgy=50 |
|  | Z Axis | Tgz=30 |

FIG. 16

| | | ポイント |
|---|---|---|
| Angular Velocity | X Axis | Give 1.0 Point to User Having Minimum Cumulative Difference Value |
| | Y Axis | Give 1.5 Points to User Having Minimum Cumulative Difference Value |
| | Z Axis | Give 1.0 Point to User Having Minimum Cumulative Difference Value |
| Acceleration | X Axis | Give 1.5 Points to User Having Minimum Cumulative Difference Value |
| | Y Axis | Give 1.0 Point to User Having Minimum Cumulative Difference Value |
| | Z Axis | Give 1.5 Points to User Having Minimum Cumulative Difference Value |

FIG. 17

| | | Point |
|---|---|---|
| Angular Velocity | X Axis | Give 1.0 Point to User Having Minimum Cumulative Difference Value |
| | Y Axis | Give 1.5 Points to User Having Minimum Cumulative Difference Value |
| | Z Axis | Give 1.0 Point to User Having Minimum Cumulative Difference Value |
| Acceleration | X Axis | Give 1.5 Points to User Having Minimum Cumulative Difference Value |
| | Y Axis | Give 1.0 Point to User Having Minimum Cumulative Difference Value |
| | Z Axis | Give 1.5 Points to User Having Minimum Cumulative Difference Value |
| | Polarity | Give 1.0 Point to User Having Same Polarity |
| | Value Range | Give 1.0 Point to User Having Value Not Larger Than 30% |

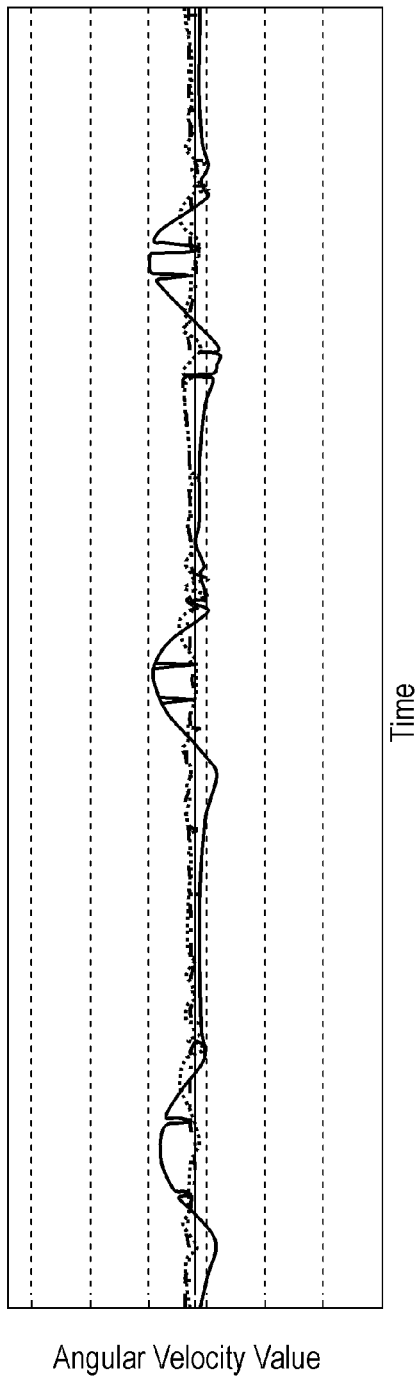
FIG. 19A — Angular Velocity Value
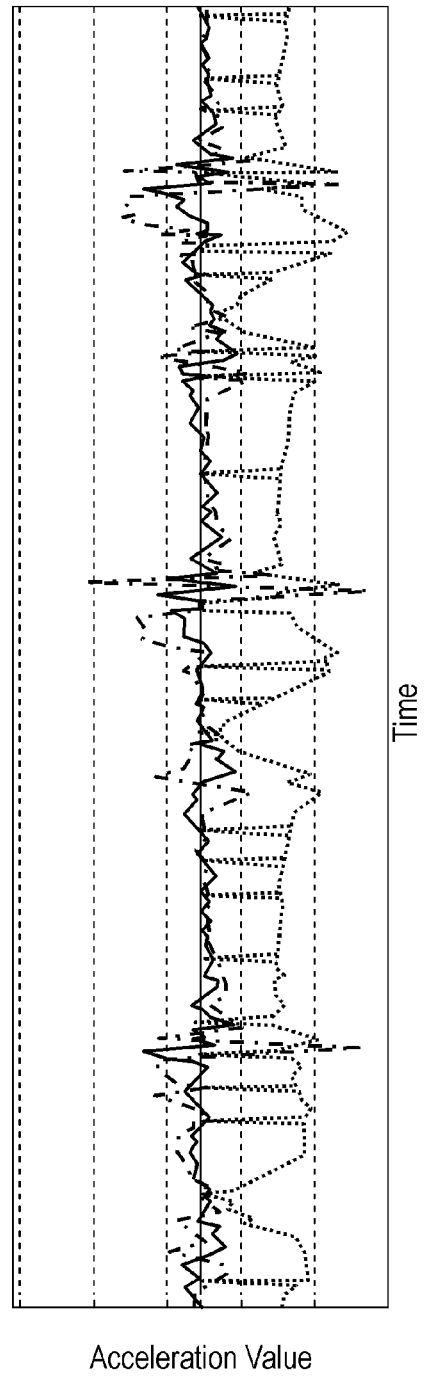
FIG. 19B — Acceleration Value Angular Velocity Value Acceleration Value

ELECTRONIC DEVICE INCLUDING INERTIAL FORCE SENSOR CAPABLE OF DETECTING MULTIPLE INERTIAL FORCES

This application is a U.S. national stage application of the PCT international application number PCT/JP2012/007443.

TECHNICAL FIELD

The present invention relates to an electronic device, such as a portable phone, electronic book, and tablet type data terminal.

BACKGROUND ART

FIG. 23 is a block diagram of conventional electronic device 1. Electronic device 1 includes detection means 2, pattern data output means 3, and comparison and determination means 4. Detection means 2 detects a movement of a writing tool when a signature is written. Pattern data output means 3 generates signature data of movement of the writing tool according to detection results from detection means 2. Comparison and determination means 4 compares the signature data generated by pattern data output means 3 with signature data of a preregistered signatory to authenticate the signatory. Detection means 2 includes a position detection means for a tablet type input device for instance, or a video camera.

Patent literature 1 describes a conventional electronic device similar to electronic device 1.

CITATION LIST

Patent Literature

Patent Literature 1: Japanese Patent Laid-Open Publication No. 07-160880

SUMMARY

An electronic device includes an inertial force sensor, a memory unit, and a control unit connected to the inertial force sensor and the memory unit. The control unit includes a characteristic-waveform processor and an authenticator. The characteristic-waveform processor is operable to generate a characteristic waveform based on output waveforms output from the inertial force sensor in response to operations performed by a first user, and to record the characteristic waveform in the memory unit. The authenticator is operable to generate a reference waveform based on one or more output waveforms output from the inertial force sensor in response to respective ones of one or more operations performed by a second user, and to determine whether or not the first user and the second user are identical to each other by comparing the reference waveform with the characteristic waveform.

This electronic device performs accurate authentication with a simple structure.

BRIEF DESCRIPTION OF DRAWINGS

FIG. 16 is a table indicating points given to a user of the electronic device according to Embodiment 5.
FIG. 17 is a table indicating points given to a user of the electronic device according to Embodiment 5.
FIG. 19A shows output waveforms of an inertial force sensor of the electronic device according to Embodiment 6.
FIG. 19B shows output waveforms of the inertial force sensor of the electronic device according to Embodiment 6.

DETAIL DESCRIPTION OF PREFERRED EMBODIMENTS

Exemplary Embodiment 1

Figure 1:
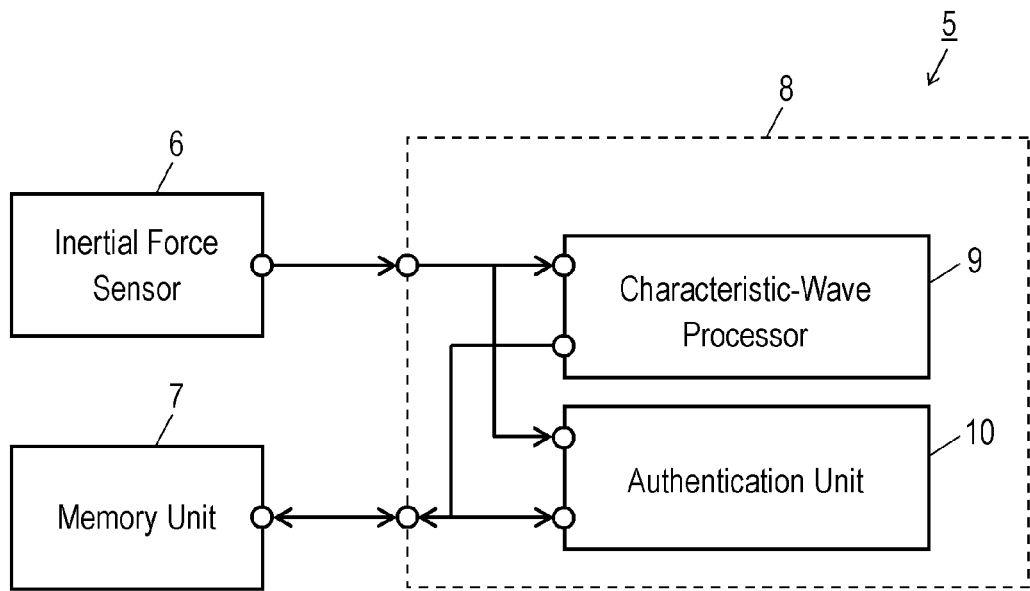
FIG. 1 is a block diagram of an electronic device according to Exemplary Embodiment 1.

FIG. 1 is a block diagram of electronic device 5 according to Exemplary Embodiment 1. Electronic device 5 includes inertial force sensor 6, memory unit 7, and control unit 8 connected to inertial force sensor 6 and memory unit 7. Control unit 8 includes characteristic-waveform processor 9 and authenticator 10.

Characteristic-waveform processor 9 is operable to generate a characteristic waveform based on plural output waveforms output from inertial force sensor 6 in response to plural operations performed by a first user, and to record the characteristic waveform in memory unit 7. Authenticator 10 is operable to generate a reference waveform based on from one or more output waveforms output from inertial force sensor 6 in response to one or more operations performed by a second user, to compare the reference waveform with the characteristic waveform, and to determine whether or not the first user and the second user are identical to each other. This structure allows electronic device 5 to perform accurate authentication.

An operation of electronic device 5 will be described below.

Figure 2:
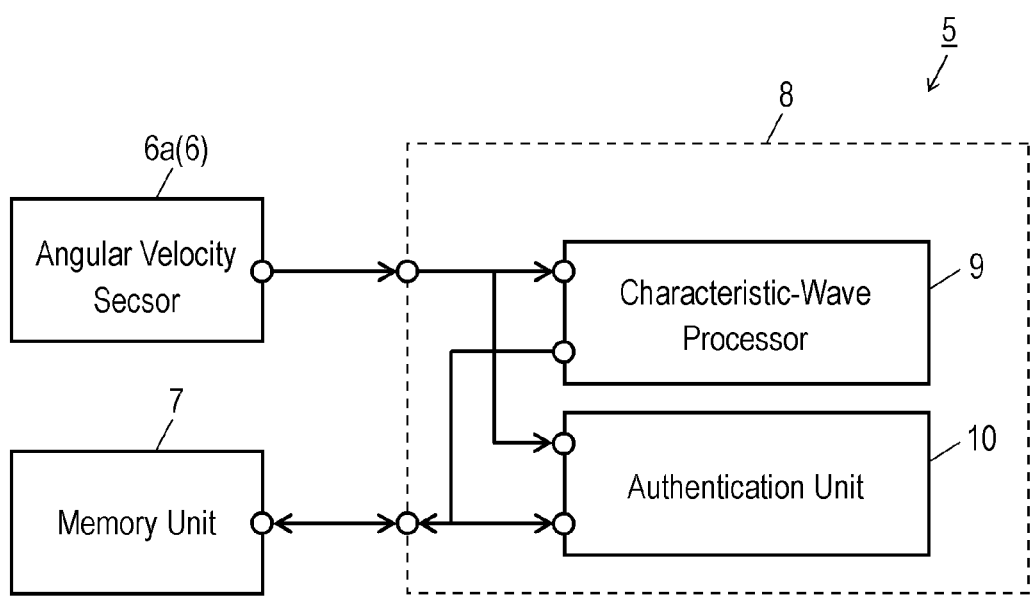
FIG. 2 is a block diagram of another electronic device according to Embodiment 1.

FIG. 2 is a block diagram of electronic device 5 according to Embodiment 1. As shown in FIG. 2, electronic device 5 according to Embodiment 1 includes angular velocity sensor 6a that detects an angular velocity applied to electronic device 5 as inertial force sensor 6 shown in FIG. 1.

Figure 3:
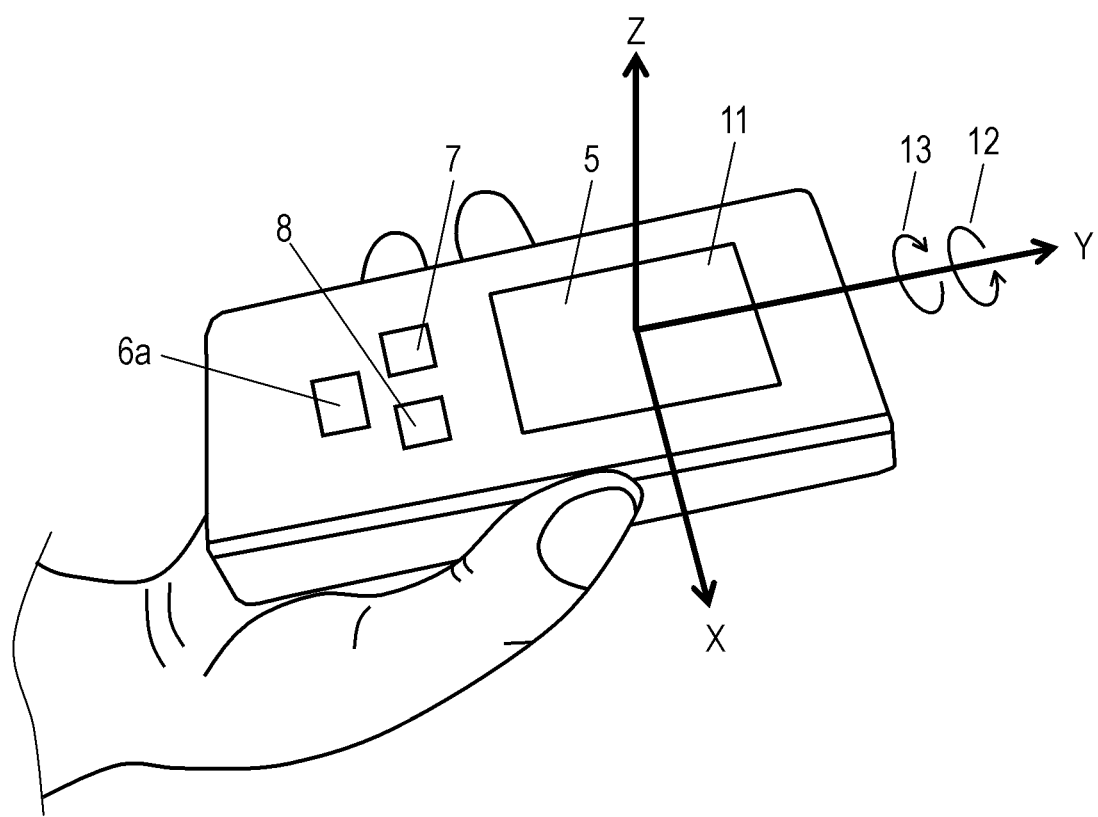
FIG. 3 is a perspective view of the electronic device according to Embodiment 1 operated by a user.

FIG. 3 is a perspective view of electronic device 5 operated by a user. Electronic device 5 includes display unit 11 provided at a surface thereof, and includes angular velocity sensor 6a, memory unit 7, and control unit 8 therein. A longitudinal direction of electronic device 5 is defined as a Y axis, a lateral direction thereof is defined as an X axis, and a direction perpendicular to an XY plane containing the X axis and the Y axis is defined as a Z axis. Angular velocity sensor 6a detects an angular velocity about the Y axis. Angular velocity sensor 6a may be a multi-axis angular velocity sensor that detects angular velocities about plural axes.

Electronic device 5 allows a user to set control unit 8 in a recording mode and an authentication mode. The user performs the above-described predetermined operation in the recording mode and performs the same operation in the authentication mode. This operation can be arbitrarily determined by the user. According to Embodiment 1, this operation is that electronic device 5 is rotated up to a maximum of 180° in counterclockwise direction 13 about the Y axis viewed from the user holding electronic device 5, and then reversed in clockwise direction 12 about the Y axis to its original position (about 0°).

When electronic device 5 is set in the recording mode, a first user performs this operation plural times, and a characteristic waveform is calculated based on plural output waveforms output from angular velocity sensor 6a and is recorded in memory unit 7. When electronic device 5 is in the authentication mode, the second user performs this operation one or more times, and a reference waveform is calculated based on from one or more output waveforms output from angular velocity sensor 6a. Control unit 8 compares this reference waveform with the characteristic waveform recorded in memory unit 7 to determine whether or not the first user and the second user are identical to each other.

An operation of characteristic-waveform processor 9 will be described in reference to FIGS. 4A to 4C.

Figure 4A:
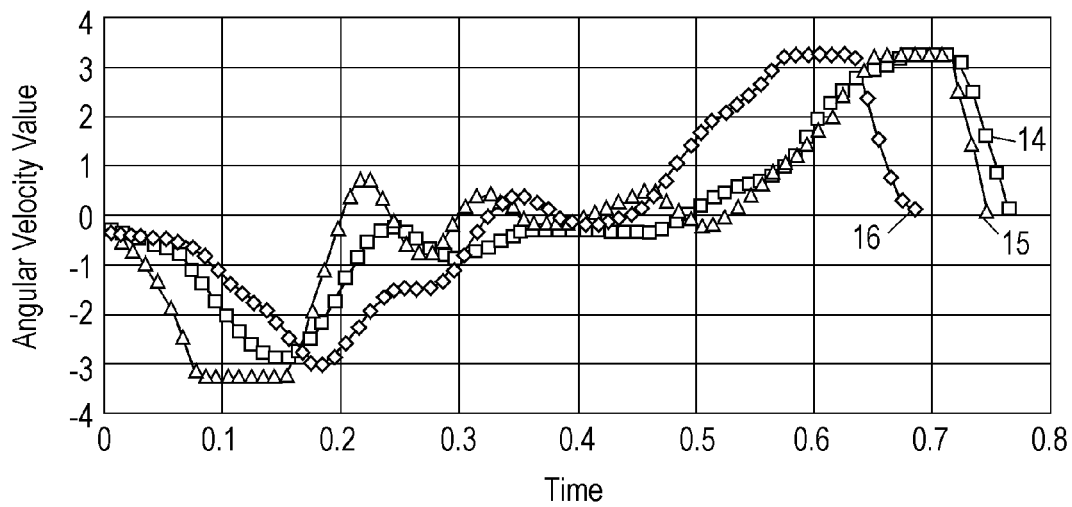
FIG. 4A shows characteristic waveforms of the electronic device.

FIG. 4A shows an output waveform output from angular velocity sensor 6a when the first user performs the above-described predetermined operation. In FIG. 4A, the horizontal axis represents time, and the vertical axis represents angular velocity. Output waveforms 14, 15 and 16 represent angular velocity values output from angular velocity sensor 6a in response to first, second, and third operations, respectively. Output waveforms 14 to 16 have negative angular velocity values in response to the rotation of electronic device 5 in counterclockwise direction 13, and have positive angular velocity values in response to the rotation of electronic device 5 in clockwise direction 12.

When an output waveform is acquired from angular velocity sensor 6a, a long period of an operation reduces the amplitude of the output waveform, accordingly preventing the wave form from indicating an individual characteristic. Hence, the operation is preferably completed within a predetermined duration, for example, within 10 seconds.

Figure 4B:
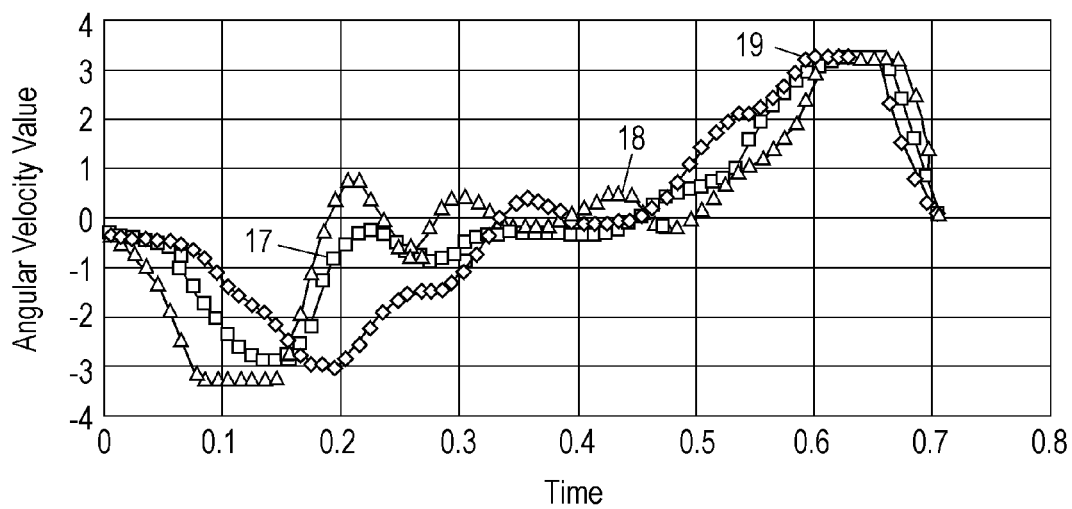
FIG. 4B shows characteristic waveforms of the electronic device.

FIG. 4B shows scaled waveforms 17 to 19 obtained by scaling output waveforms 14 to 16, respectively. In FIG. 4A, the horizontal axis represents time, and the vertical axis represents angular velocity value. As shown in FIG. 4A, one period of output waveform 14 corresponding to the first operation is about 0.77 seconds, one period of output waveform 15 corresponding to the second operation is about 0.75 seconds; and one period of output waveform 16 corresponding to the third operation is about 0.69 seconds. Even the same operations by the same user thus generally take different periods. In order to obtain a characteristic waveform, waveforms 14 to 16 are scaled to cause the periods of waveforms 14 to 16 to be identical to each other. According to Embodiment 1, characteristic-waveform processor 9 adjusts sampling points of output waveforms 14 to 16 so that all the periods of output waveforms 14 to 16 are 0.70 seconds, thereby obtaining scaled waveforms 17 to 19.

Figure 4C:
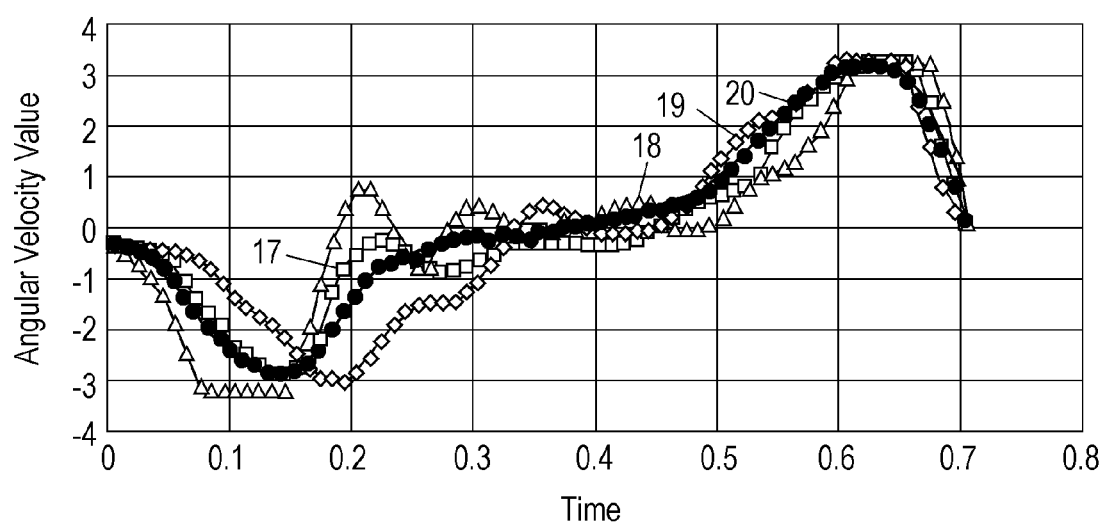
FIG. 4C shows characteristic waveforms of the electronic device.

FIG. 4C shows characteristic waveform 20 obtained by averaging scaled waveforms 17 to 19. In FIG. 4C, the horizontal axis represents time, and the vertical axis represents angular velocity value. The three angular velocity values of scaled waveforms 17 to 19 are averaged at each sampling point to obtain the angular velocity value of characteristic waveform 20. Control unit 8 records characteristic waveform 20 as a characteristic waveform of the first user.

Figure 5A:
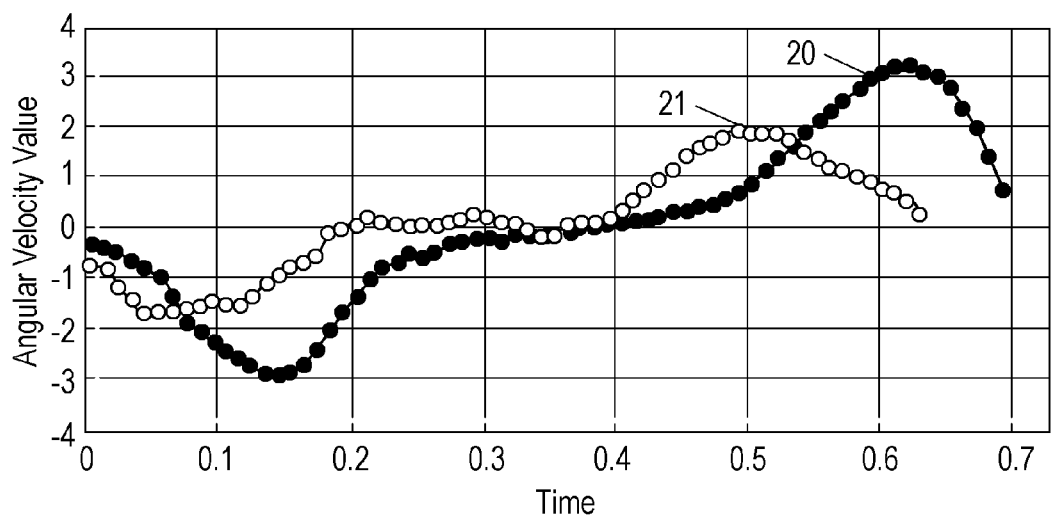
FIG. 5A shows a characteristic waveform and a reference waveform of the electronic device.
Figure 5B:
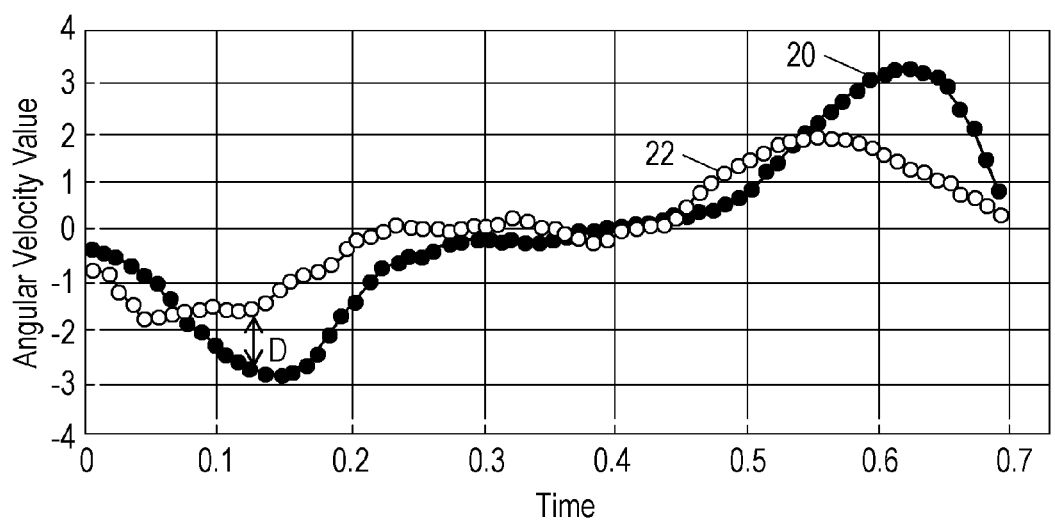
FIG. 5B shows a characteristic waveform and a reference waveform of the electronic device.

An operation of authenticator 10 will be described below in reference to FIGS. 5A and 5B.

While characteristic waveform 20 is recorded in memory unit 7, the second user performs the above-described predetermined operations on electronic device 5. FIG. 5A shows characteristic waveform 20 of the first user and reference waveform 21 of the second user. In FIG. 5A, the horizontal axis represents time, and the vertical axis represents angular velocity value. Authenticator 10 may obtain reference waveform 21 using an output waveform output from angular velocity sensor 6a in response to one or more operations performed by the second user. In other words, authenticator 10 may obtain reference waveform 21 by using an output waveform output from angular velocity sensor 6a in response to one operation by the second user, or by scaling and averaging plural output waveforms output from angular velocity sensor 6a in response to plural operations performed by the second user, similarly to characteristic waveform 20. According to Embodiment 1, authenticator 10 obtains reference waveform 21 in response to one operation.

Authenticator 10 performs a scaling process that adjusts sampling points so as to match the period of reference waveform 21 with the period of characteristic waveform 20, thereby obtaining reference waveform 22. FIG. 5B illustrates reference waveform 22 obtained by the scaling process. In FIG. 5B the horizontal axis represents time, and the vertical axis represents angular velocity value.

Authenticator 10 may obtain reference waveform 22 by scaling reference waveform 21 not only in time but also in amplitude of the angular velocity value. In this case, the scaling is performed both in time and amplitude, for example, so as to allow operations during one period to have the same amount of energy. In the case that the scaling ratio in time for matching the periods is Ma, namely, that reference waveform 22 is determined by enlarging reference waveform 21 by Ma in time, the amplitude of reference waveform 21 is multiplied by 1/Ma to determine the scaling ratio in amplitude to be 1/Ma. This operation is performed for the following reason. Even the same person may perform an operation for various periods. According to experiments, it was confirmed that change of the period of an operation causes the amplitude to change according to the change of the period. This is because users are characterized different amounts of energy consumed by the users. Thus, the scaling in amplitude performed according to the scaling in time allows reference waveform 21 to be accurately compared with characteristic waveform 20, further increasing authentication accuracy.

Authenticator 10 evaluates similarity between reference waveform 22 and characteristic waveform 20 after the scaling to determine whether or not the first user and the second user are identical to each other. Authenticator 10 can evaluate the similarity between the waveforms by accumulating the difference between the waveforms or by calculating a mutual correlation coefficient between the waveforms.

According to Embodiment 1, authenticator 10 preforms the former method due to light calculation load. Cumulative difference value D is calculated by adding the differences of angular velocity values of the two waveforms at respective sampling points at all the time points from time point t to period Tt. When cumulative difference value D is smaller than the predetermined threshold, the first user and the second user are determined to be identical to each other. More specifically, cumulative difference value D is expressed as formula 1 with angular velocity value Yt(t) of characteristic waveform 20 at time point t and angular velocity value Ys(t) of reference waveform 22, and cumulative difference value D is compared with predetermined threshold Ty. Authenticator 10 determines that the first user and the second user are identical to each other when formula 1 is satisfied.

$$D = \sum_{t=0}^{Tt} |Yt(t) - Ys(t)| < Ty \quad \text{(Formula 1)}$$

According to Embodiment 1, authentication is performed in the condition of Ty=30. In FIG. 5B, at time point of 0.13 second, the angular velocity value of reference waveform 22 is −1.5, and the angular velocity value of characteristic waveform 20 is −2.8. Thus, the absolute value of the difference value at this time point is 1.3. Authenticator 10 calculates the difference value between reference waveform 22 and characteristic waveform 20, and calculates cumulative difference value D that is the sum of the difference values at all the time points throughout one period, thereby providing cumulative difference value D of 53, which is larger than threshold Ty and does not satisfy formula 1. Hence, authenticator 10 determines that the first and the second user are different from each other.

Figure 6A:
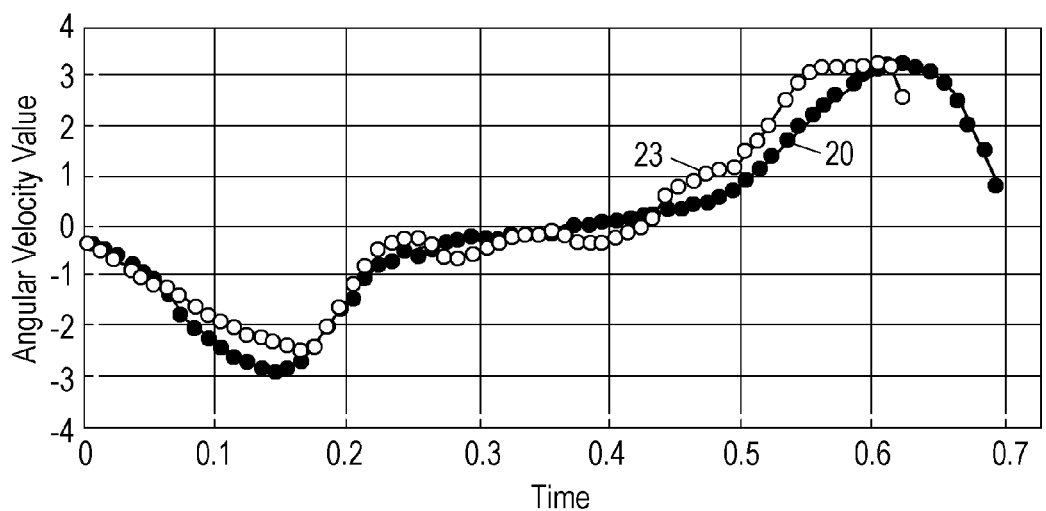
FIG. 6A shows a characteristic waveform and a reference waveform of the electronic device.
Figure 6B:
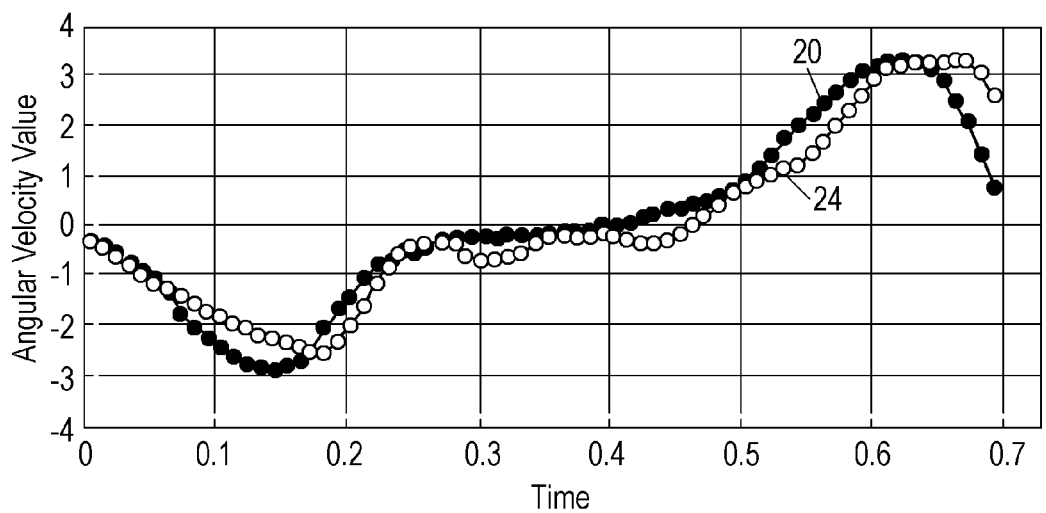
FIG. 6B shows a characteristic waveform and a reference waveform of the electronic device.

FIG. 6A shows characteristic waveform 20 by the first user of electronic device 5 and reference waveform 23 by a third user. FIG. 6B shows reference waveform 24 obtained by scaling reference waveform 23 so as to match the period of reference waveform 23 with the period of characteristic waveform 20. Referring to formula 1, cumulative difference value D obtained by adding the difference values at all the time points in one period is 28, which is smaller than threshold Ty and satisfies formula 1. Hence, authenticator 10 determines that the first and third users are identical to each other.

In electronic device 5 according to Embodiment 1, angular velocity sensor 6a detects angular velocity about the Y axis. Angular velocity sensor 6a may be a multi-axis angular velocity sensor that detects angular velocities about plural axes. For example, angular velocity sensor 6a may be a two-axis angular velocity sensor that detects angular velocities about the X axis and the Y axis. When control unit 8 of electronic device 5 is in the recording mode, control unit 8 records, in memory unit 7, characteristic waveforms of angular velocity about the X and Y axes in response operation by the first user. When electronic device 5 is in the authentication mode, authenticator 10 obtains reference waveforms of angular velocities about the X and Y axes kin response to operation by the second user. When formula 1 is satisfied for both X and Y axes, authenticator 10 determines that the first and second users are identical to each other. Electronic device 5 according to Embodiment 1 thus employs plural angular velocity values about plural axes, thereby further increasing determination accuracy.

A threshold for angular velocity about the X axis corresponding to threshold Ty in formula 1 is threshold Tyx. A threshold for angular velocity about the Y axis corresponding to threshold Ty in formula 1 is threshold Tyy. Threshold Tyx may be different from threshold Tyy. As shown in FIG. 3, since the user rotates electronic device 5 about the Y axis, a longitudinal direction of electronic device 5, the waveform of angular velocity about the Y axis exhibits the user's individual characteristics most remarkably. Hence, threshold Tyy is determined to be smaller than threshold Tyx, thereby increasing authentication accuracy.

Exemplary Embodiment 2

Figure 7:
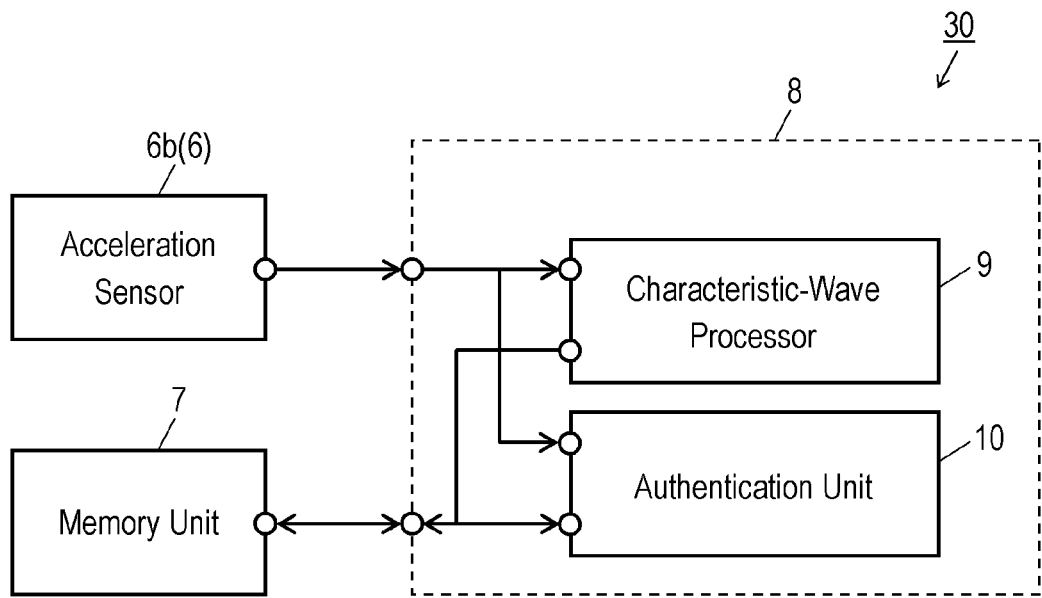
FIG. 7 is a block diagram of an electronic device according to Exemplary Embodiment 2.

FIG. 7 is a block diagram of electronic device 30 according to Exemplary Embodiment 2. In FIG. 7, components identical to those of electronic device 5 according to Embodiment 1 shown in FIG. 2 are denoted by the same reference numerals. Electronic device 5 according to Embodiment 2 includes acceleration sensor 6b that detects acceleration applied to electronic device 5 as inertial force sensor 6, instead of angular velocity sensor 6a.

Figure 8:
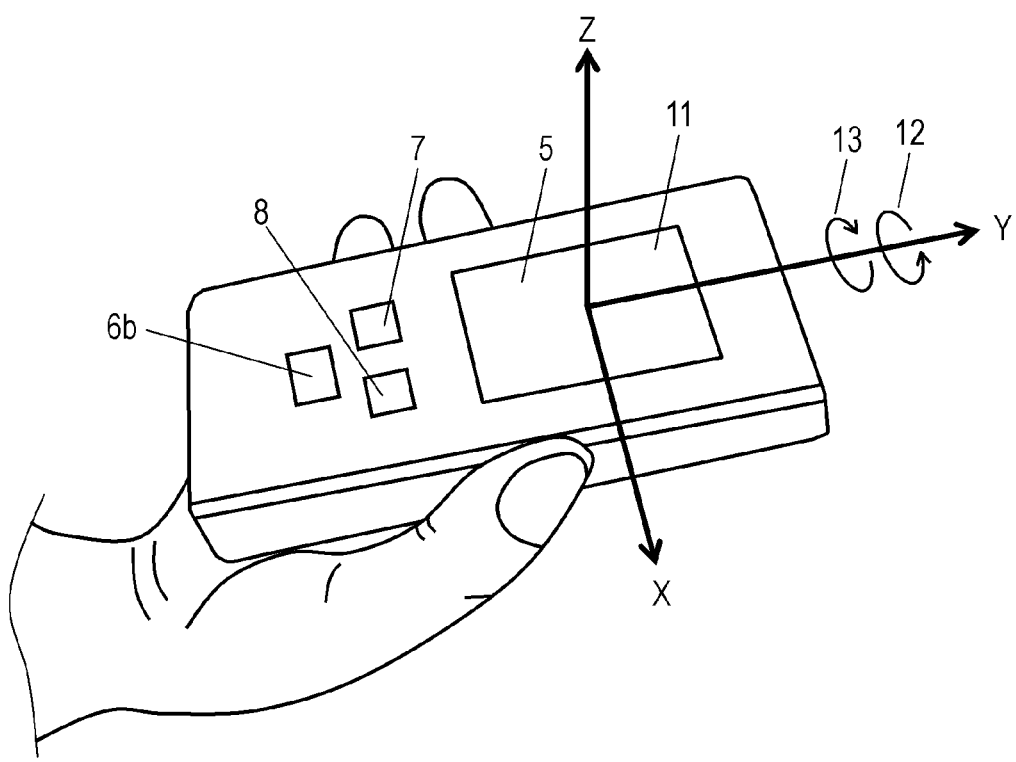
FIG. 8 is a perspective view of the electronic device according to Embodiment 2 operated by a user.

FIG. 8 is a perspective view of electronic device 30 operated by a user. A longitudinal direction of electronic device 30 is assumed to be a Y axis; a lateral direction electronic device 30 is assumed to be an X axis; and a direction perpendicular to the X-Y plane including the X and Y axes electronic device 30 is assumed to be a Z axis. Acceleration sensor 6b detects acceleration in a direction of the Z axis of electronic device 30. Here, acceleration velocity sensor 6b may be a multi-axis acceleration velocity sensor that detects accelerations in direction of plural axes.

Similarly to electronic device 5 according to Embodiment 1 shown in FIG. 3, a user rotates electronic device 30 in counterclockwise direction 13 about the Y axis viewed from the user holding the device, and then rotates the device in clockwise direction 12 about the Y axis.

Similarly to electronic device 5 according to Embodiment 1, when control unit 8 of electronic device 30 is in the recording mode, characteristic-waveform processor 9 calculates a characteristic waveform in response to operation by a first user and records the waveform in memory unit 7. When control unit 8 of electronic device 30 is in the authentication mode, authenticator 10 calculates a reference waveform in response to operation by a second user, and compares this reference waveform with the characteristic waveform recorded in memory unit 7 to determine whether or not the first and second users are identical to each other.

Figure 9A:
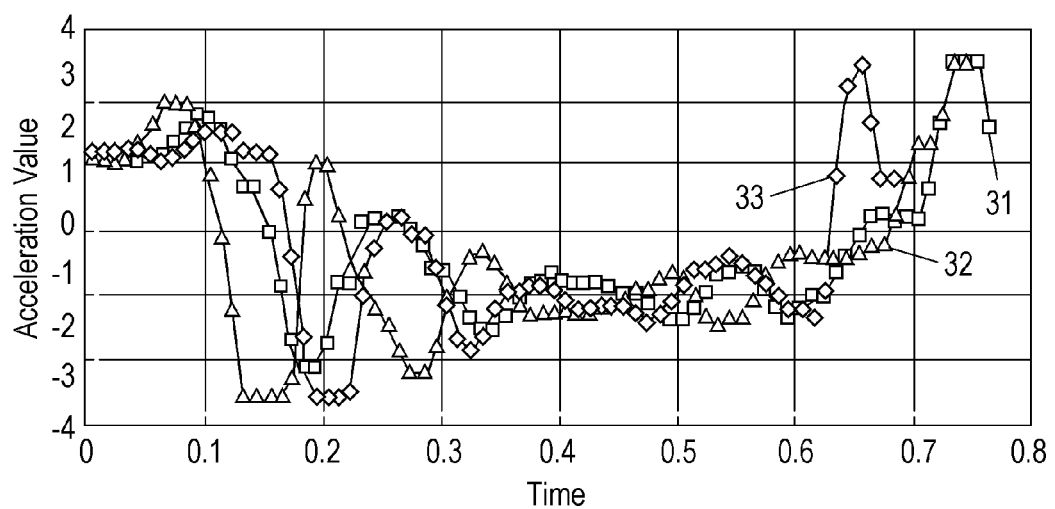
FIG. 9A shows characteristic waveforms of the electronic device according to Embodiment 2.

FIG. 9A shows output waveforms supplied from acceleration sensor 6b when the first user operates electronic device 30. In FIG. 9A, the horizontal axis represents time, and the vertical axis represents acceleration value. Output waveforms 31 to 33 represent acceleration values in a direction of the Z axis supplied from acceleration sensor 6b in response to first, second, and third operations by the first user, respectively.

Figure 9B:
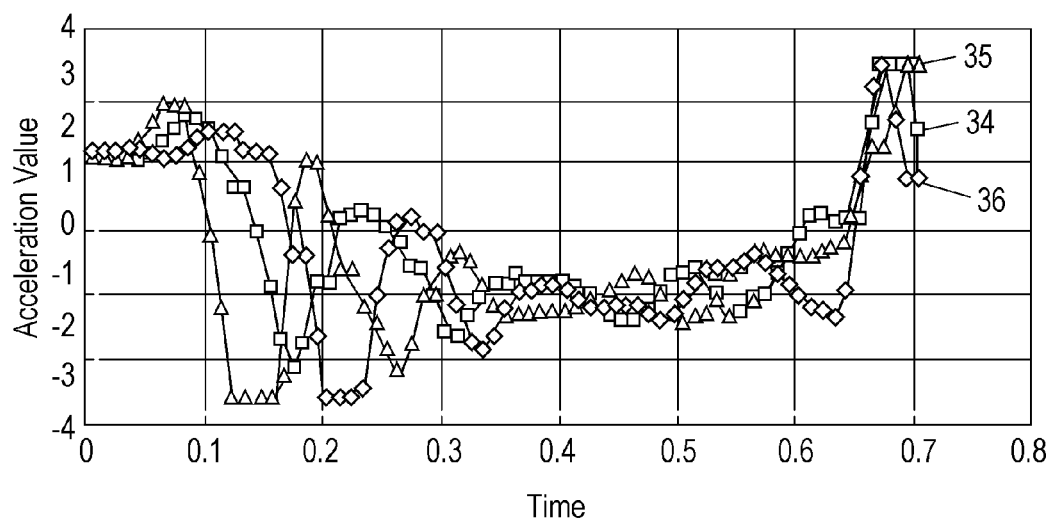
FIG. 9B shows characteristic waveforms of the electronic device according to Embodiment 2.

FIG. 9B shows scaled waveforms 34 to 36 that are output waveforms 31 to 33 after being scaled so as to match the periods of output waveforms 31 to 33.

Figure 9C:
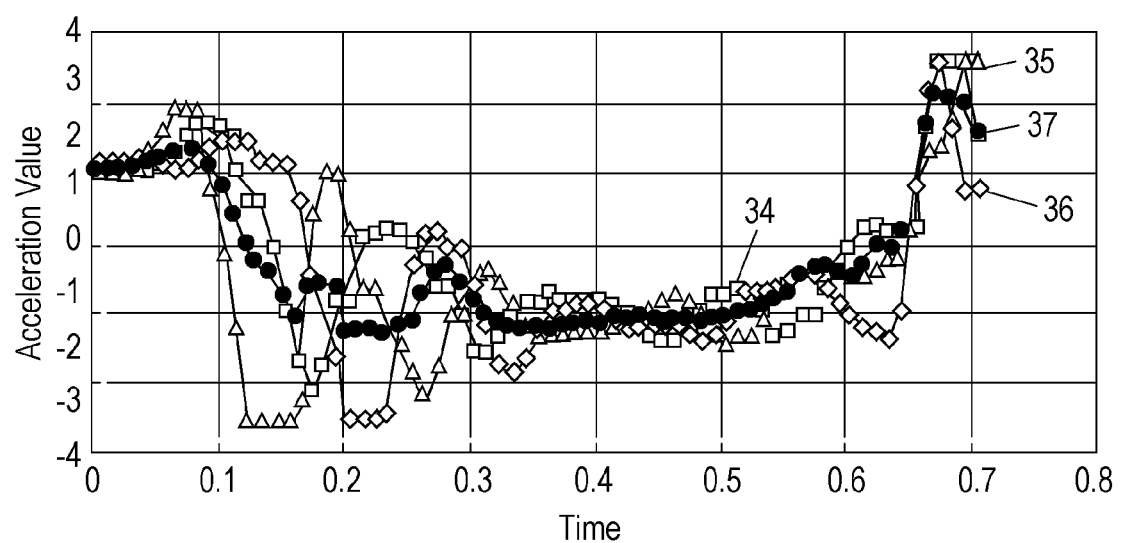
FIG. 9C shows characteristic waveforms of the electronic device according to Embodiment 2.

FIG. 9C shows characteristic waveform 37 obtained by averaging scaled waveforms 34 to 36 by characteristic-waveform processor 9 of control unit 8. Characteristic-waveform processor 9 records characteristic waveform 37 as the characteristic waveform of the first user.

Figure 10A:
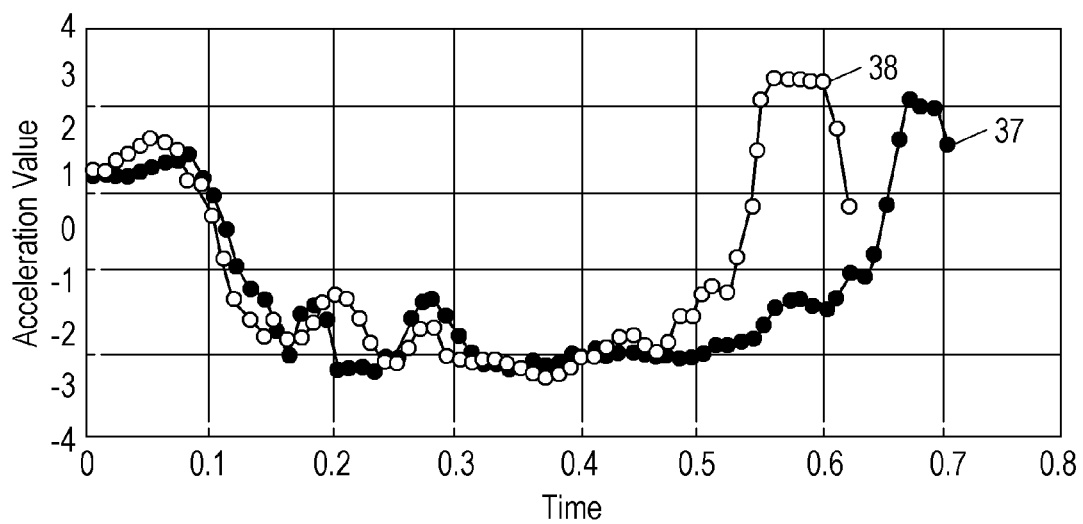
FIG. 10A shows a characteristic waveform and a reference waveform of the electronic device according to Embodiment 2.

FIG. 10A shows characteristic waveform 37 of the first user and reference waveform 38 by the second user. In FIG. 10A, the horizontal axis represents time, and the vertical axis represents acceleration value. According to Embodiment 2, authenticator 10 obtains a reference waveform based on a single operation by a user.

Figure 10B:
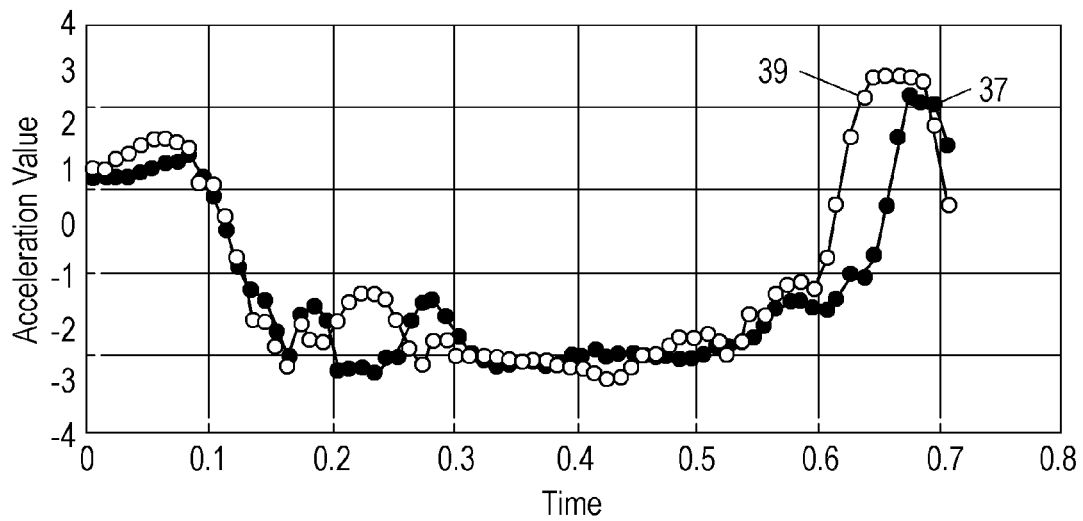
FIG. 10B shows a characteristic waveform and a reference waveform of the electronic device according to Embodiment 2.

FIG. 10B shows reference waveform 39 obtained by scaling waveform 38 in authenticator 10 so as to match the period of reference waveform 38 with that of characteristic waveform 37.

Authenticator 10 evaluates similarity between reference waveform 39 and characteristic waveform 37 to determine whether or not the first and second users are identical to each other. Similarly to the device according to Embodiment 1, authenticator 10 evaluates similarity between the two waveforms by accumulating the difference between the two waveforms. Concretely, cumulative difference value D is calculated by adding the differences of acceleration values of the two waveforms at respective sampling points from time point t to period Tt. More specifically, cumulative difference value D is expressed by formula 2 with acceleration value Gt(t) of characteristic waveform 37 at time point t and acceleration value Gs(t) of reference waveform 39. Cumulative difference value D is compared with predetermined threshold Tg. Authenticator 10 determines that the first and second users are identical to each other if formula 2 is satisfied.

$$D = \sum_{t=0}^{Tt} |Gt(t) - Gs(t)| < Tg \quad \text{(Formula 2)}$$

According to Embodiment 2, authentication is performed in the condition of Tg=30. In FIG. 10B, cumulative difference value D that is the sum of the difference values all the time points throughout the period is 26, which is smaller than threshold Tg and satisfies formula 2. Hence, authenticator 10 determines that the first and second users are identical to each other.

According to Embodiment 2, acceleration sensor 6b detects acceleration in a direction of the Z axis. Acceleration sensor 6b may be a multi-axis acceleration sensor that detects accelerations in directions of plural axes. For example, acceleration sensor 6b may be a two-axis acceleration sensor that detects accelerations in directions of the Z and X axes. When formula 2 is satisfied for both Z and X axes, authenticator 10 determines that the first and second users are identical to each other. The electronic device according to Embodiment 2 thus employs plural acceleration values, thereby further increasing determination accuracy.

A threshold of acceleration in the direction of the Z axis corresponding to threshold Tg in formula 2 is threshold Tgz while a threshold of acceleration in the direction of the X axis corresponding to threshold Tg in formula 2 is threshold Tgx. Threshold Tgz may be different from threshold Tgx. This arrangement allows the axis essential for operation of electronic device 30 used in authentication to change, thereby further increasing determination accuracy.

Exemplary Embodiment 3

Figures 11, 12:
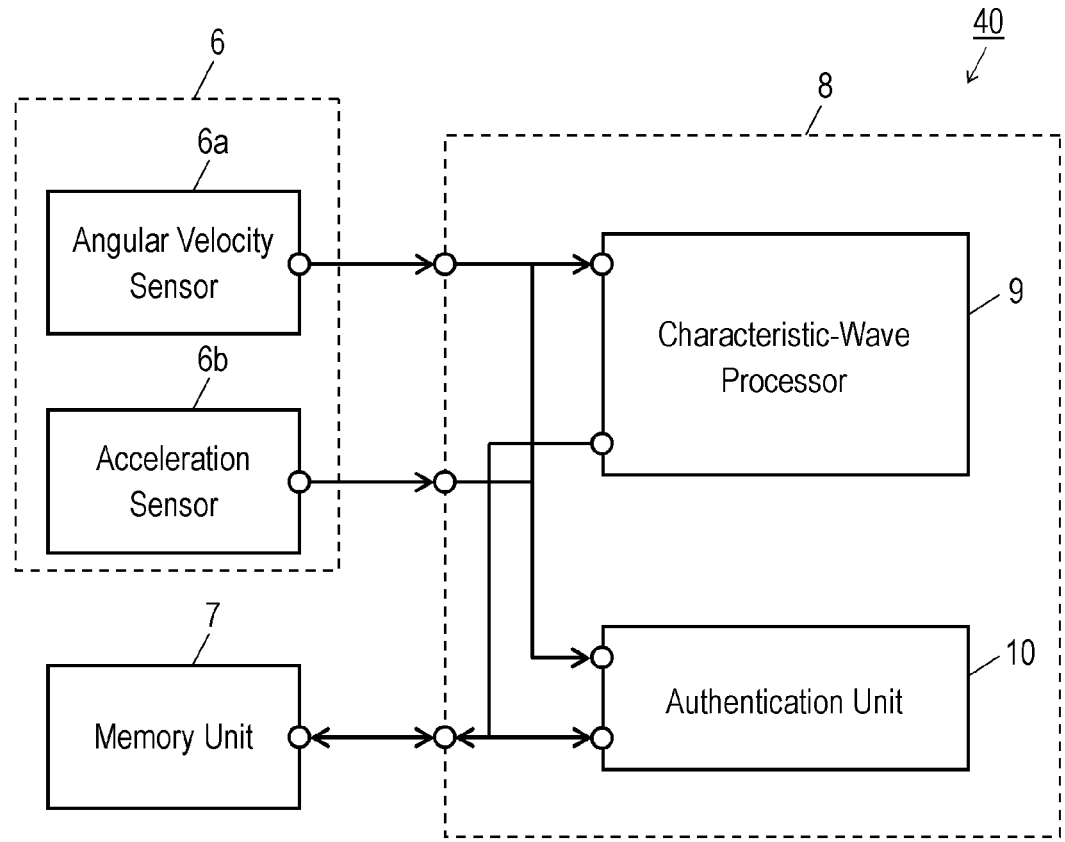
FIG. 11 is a block diagram of an electronic device according to Exemplary Embodiment 3.
FIG. 12 shows thresholds of angular velocity and acceleration on each axis of the electronic device according to Embodiment 3.

FIG. 11 is a block diagram of electronic device 40 according to Exemplary Embodiment 3. In FIG. 11, components identical to those of electronic devices 5 and 30 shown in FIGS. 2 and 7 are denoted by the same reference numerals. Electronic device 40 according to Embodiment 3 includes two sensors: angular velocity sensor 6a and acceleration sensor 6b as inertial force sensor 6. Angular velocity sensor 6a according to Embodiment 3 detects three angular velocities about three axes: the X, Y, and Z axes while acceleration sensor 6b detects three accelerations in directions of the three axes.

In electronic device 40 according to Embodiment 3, control unit 8 uses formula 1 to acquire a characteristic waveform and a reference waveform by angular velocity sensor 6a and to perform authentication similarly to electronic device 5 according to Embodiment 1. In electronic device 40, control unit 8 uses formula 2 to acquire a characteristic waveform and a reference waveform by acceleration sensor 6b and to perform authentication similarly to electronic device 30 according to Embodiment 2. Thresholds Ty of formula 1 and thresholds Tg of formula 2 are different for these axis.

Similarly to the devices according to Embodiments 1 and 2, electronic device 40 according to Embodiment 3 is rotated in counterclockwise direction 13 about the Y axis viewed from a user holding electronic device 40, and then rotated in clockwise direction 12 about the Y axis.

FIG. 12 shows thresholds of angular velocity and acceleration for each axis of electronic device 40. Since electronic device 40 is rotated about the Y axis, the change amount of components of the Y-axis is the largest of components the three axes supplied from angular velocity sensor 6a. According to experiments, user's characteristic is reflected on the component of the Y-axis most significantly, on the component of the Z-axis the second most significantly, and on the component of the X-axis the least significantly. Hence, threshold Tyy of the component of the Y-axis corresponding to threshold Ty in formula 1 is the smallest value, 30, threshold Tyz of the component the Z-axis component is 40; and threshold Tyx of the X-axis component is 50. For acceleration sensor 6b, the user's characteristic of operation is reflected on the component of the Z-axis the largest, on the component of the X-axis the second largest, and on the component of the Y-axis component least. Hence, threshold Tgz of the component of the Z-axis corresponding to threshold Tg in formula 2 is the smallest value, 30, threshold Tgx of the component of the X-axis is 40, and threshold Tgy of the component of the Y-axis component is 50. The thresholds of the axis that reflects user's characteristics are determined to be different from each other according to operation, thereby increasing authentication accuracy.

Exemplary Embodiment 4

Figure 13:
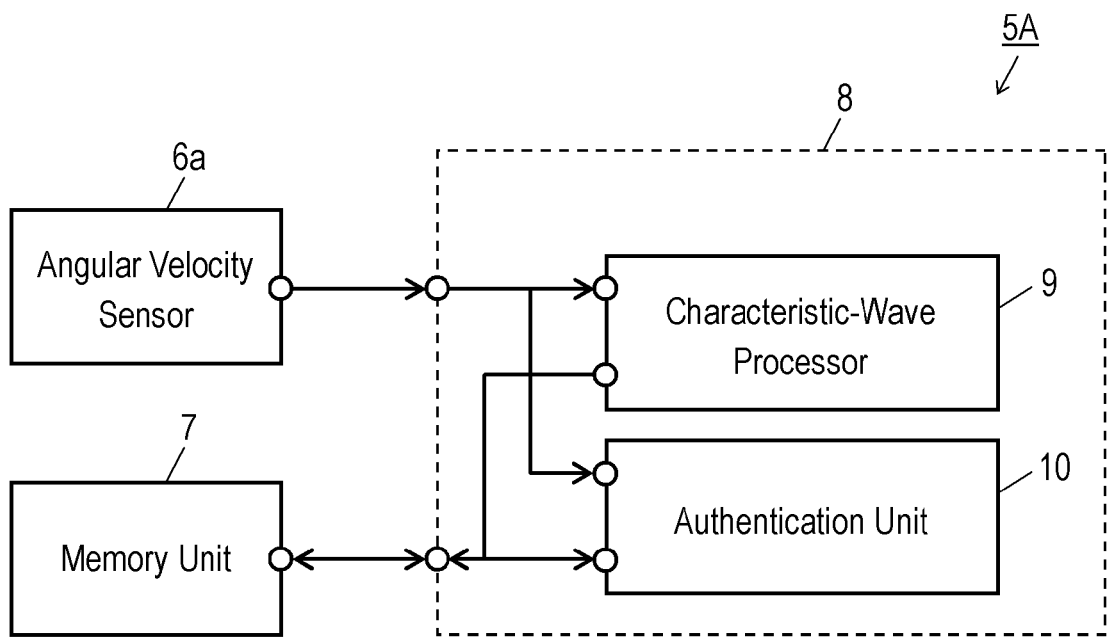
FIG. 13 is a block diagram of an electronic device according to Exemplary Embodiment 4.

FIG. 13 is a block diagram of electronic device 5A according to Exemplary Embodiment 4. In FIG. 13, components identical to those of electronic device 5 shown in FIG. 2 are denoted by the same reference numerals. When control unit 8 of electronic device 5A is in the recording mode, control unit 8 records plural characteristic waveforms of plural users in memory unit 7. When control unit 8 of electronic device 5A is in the authentication mode, authenticator 10 identifies a user corresponding to the characteristic waveform most similar to the reference waveform. When electronic device 5 is used by plural users, for instance, electronic device 5A according to Embodiment can authenticate a user.

Figure 14A:
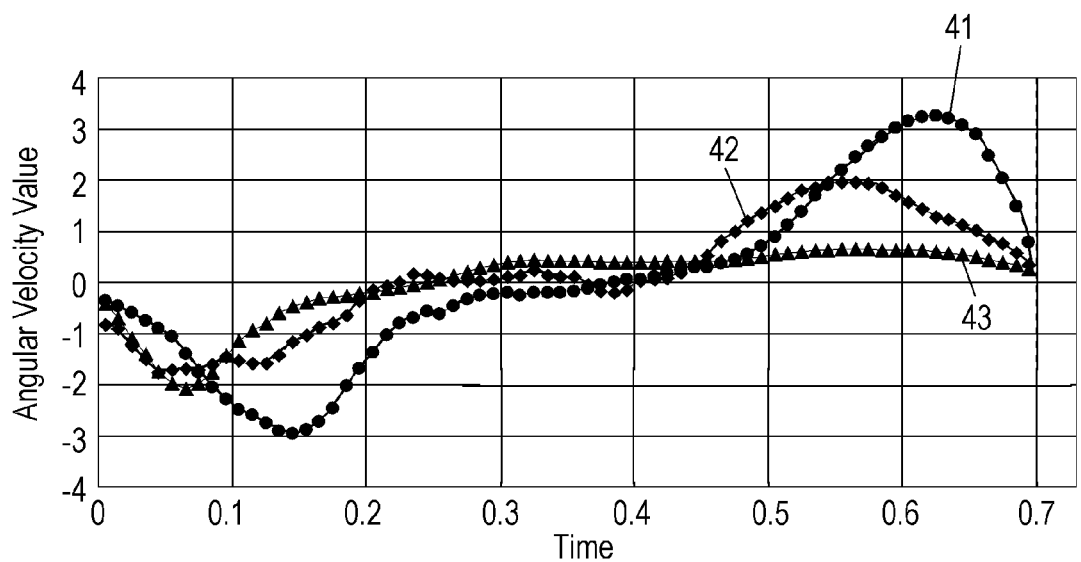
FIG. 14A shows characteristic waveforms of the electronic device according to Embodiment 4.

FIG. 14A shows characteristic waveform 41 by user A1, characteristic waveform 42 by user A2, and characteristic waveform 43 by user A3. Characteristic-waveform processor 9 records characteristic waveforms 41 to 43 in memory unit 7.

Figure 14B:
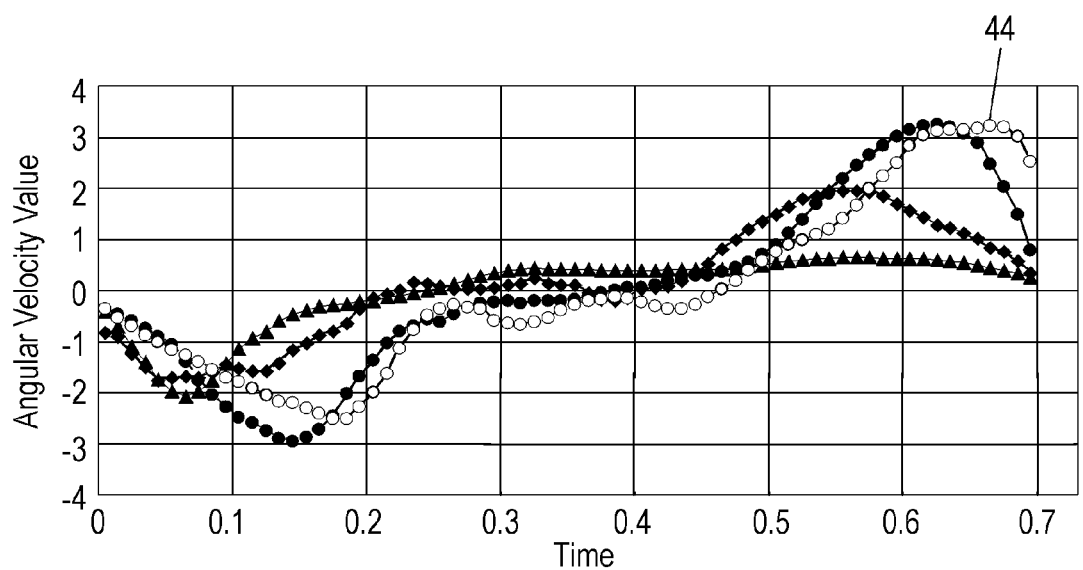
FIG. 14B is graph of reference waveforms of the electronic device according to Embodiment 4.

FIG. 14B shows reference waveform 44 obtained by scaling, in authenticator 10, a reference waveform output from angular velocity sensor 6a when control unit 8 of electronic device 5A is in the authentication mode.

To authenticate a user, cumulative difference value D(X) is calculated by adding the differences between reference waveform 44 and each of characteristic waveforms 41 to 43 throughout the entire period. Here, the variable "X" represents users A1 to A3. Authenticator 10 calculates cumulative difference values D(A1), D(A2), and D(A3) from reference waveform 44 and each of characteristic waveform 41 by user A1, characteristic waveform 42 by user A2, and characteristic waveform 43 by user A3, respectively. Concretely, cumulative difference value D(X) is calculated by adding the differences of angular velocity values at sampling points of the two waveforms throughout the entire period from time point t to period Tt. Cumulative difference value D(X) is calculated by formula 3 with angular velocity values Yt(t) of characteristic waveforms 41, 42, and 43 by users A1, A2, and A3, respectively and angular velocity values Ys(t) of reference waveform 44.

$$D(X) = \sum_{t=0}^{Tt} |Yt(t) - Ys(t)|$$ (Formula 3)

Authenticator 10 determines that the user corresponding to the smallest cumulative difference value of cumulative difference values D(A1) to D(A3) corresponding to users A1 to A3 is identical to the user who has generated the reference waveform and is currently operating the device.

The above-described authentication method of electronic device 5A according to Embodiment 4 may be applied to electronic devices 30 and 40 according to Embodiments 2 and 3. This allows the device to identify a user out of plural users operating the device even if they share electronic device 30 or 40.

Exemplary Embodiment 5

Figure 15:
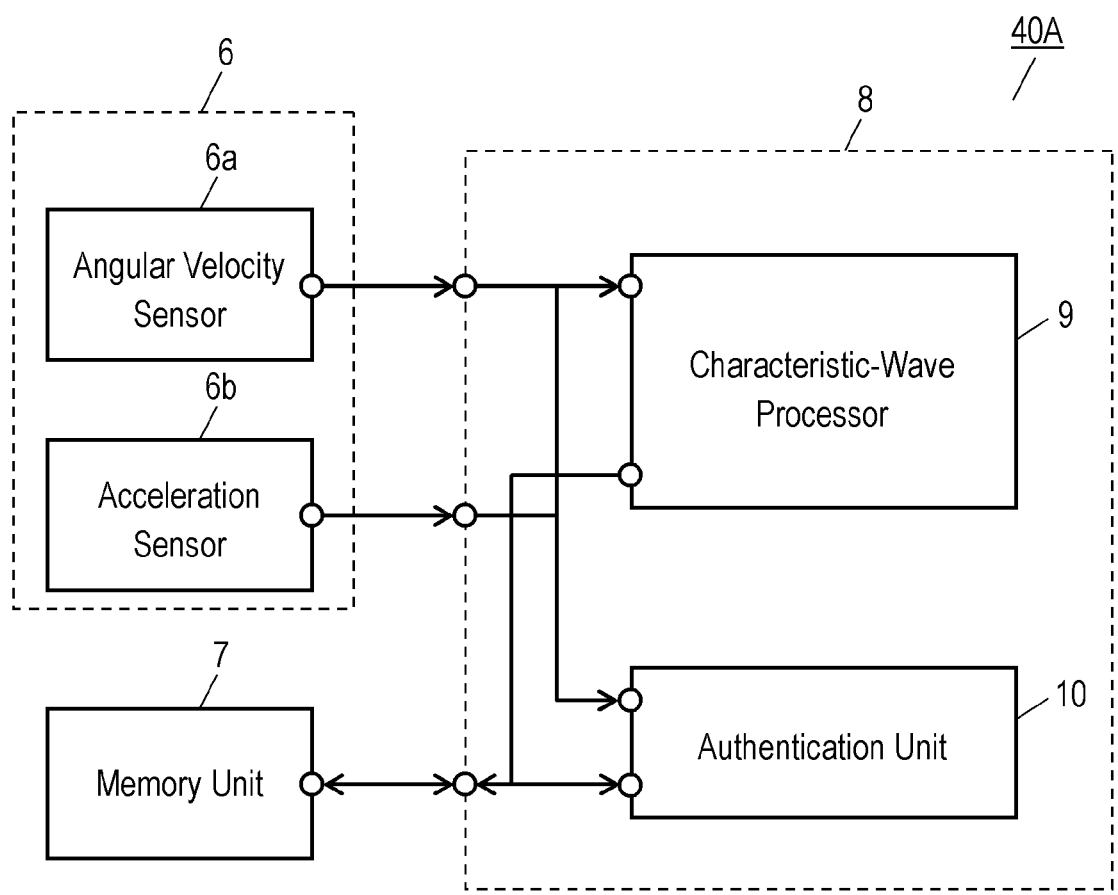
FIG. 15 is a block diagram of an electronic device according to Exemplary Embodiment 5.

FIG. 15 is a block diagram of electronic device 40A according to Exemplary Embodiment 5. In FIG. 15, components identical to those of electronic device 40 according to Embodiment 3 shown in FIG. 11 are denoted by the same reference numerals. Similarly to electronic device 5A according to Embodiment 4, when control unit 8 of electronic device 40A is in the recording mode, characteristic-waveform processor 9 records plural characteristic waveforms by plural users in memory unit 7. When control unit 8 of electronic device 40A is in the authentication mode, authenticator 10 identifies a user corresponding to a characteristic waveform most similar to the reference waveform out of the recorded characteristic waveforms.

In electronic device 40A, authenticator 10 gives points to a user who has a minimum cumulative difference value for each detection axis of angular velocity sensor 6a. Similarly, authenticator 10 gives points to a user who has a minimum cumulative difference value for each detection axis of angular velocity sensor 6b. FIG. 16 shows points given to a user who has a minimum cumulative difference value for each detection axis of angular velocity sensor 6a and the points of angular velocity sensor 6b. Authenticator 10 calculates the sum of points given to the users and determines that the user who has the largest total is identical to the user who has generated the reference waveform and is currently operating the device.

As shown in FIG. 16, points to be given may be different depending on the type of a sensor and a detection axis. This configuration allows authenticator 10 to authenticate a user taking account of the type of a sensor and a detection axis reflecting user's individual characteristics most remarkably, thereby increasing authentication accuracy.

FIG. 17 shows other points given by authenticator 10. In addition to angular velocity about the three axes and acceleration in the directions of the three axes shown in FIG. 16, authenticator 10 gives points according to the polarity and value range of acceleration as well. This configuration allows authenticator 10 to authenticate a user based on how the user holds and operates electronic device 40.

The polarity of acceleration is determined by totally adding acceleration values throughout one period, resulting in a positive, zero, or negative value. Authenticator 10 gives 1.0 point to a user who has the same polarity between the characteristic waveform and the reference waveform for each axis for detecting acceleration. The polarity of acceleration for authentication allows authenticator 10 to authenticate a user accurately based on an angle at which the user grasps electronic device 40.

The value range of acceleration is the difference between the maximum acceleration value and the minimum. Authenticator 10 compares the value range of a characteristic waveform with that of a reference waveform for each axis for detecting acceleration. When the difference between the value ranges is within a predetermined threshold range, authenticator 10 gives 1.0 point to a user corresponding to the characteristic waveform. In FIG. 17, when the difference is within 30% of the characteristic waveform, for instance, authenticator 10 gives 1.0 point to a user corresponding to the characteristic waveform. The value range of acceleration for authentication allows authenticator 10 to authenticate a user accurately based on an operation range in which the user operates electronic device 40.

The waveform with which the polarity and value range are detected may be waveforms output from angular velocity sensor 6a and acceleration sensor 6b or scaled waveforms.

the polarity and value range of acceleration for authentication increases authentication accuracy.

Exemplary Embodiment 6

Figure 18:
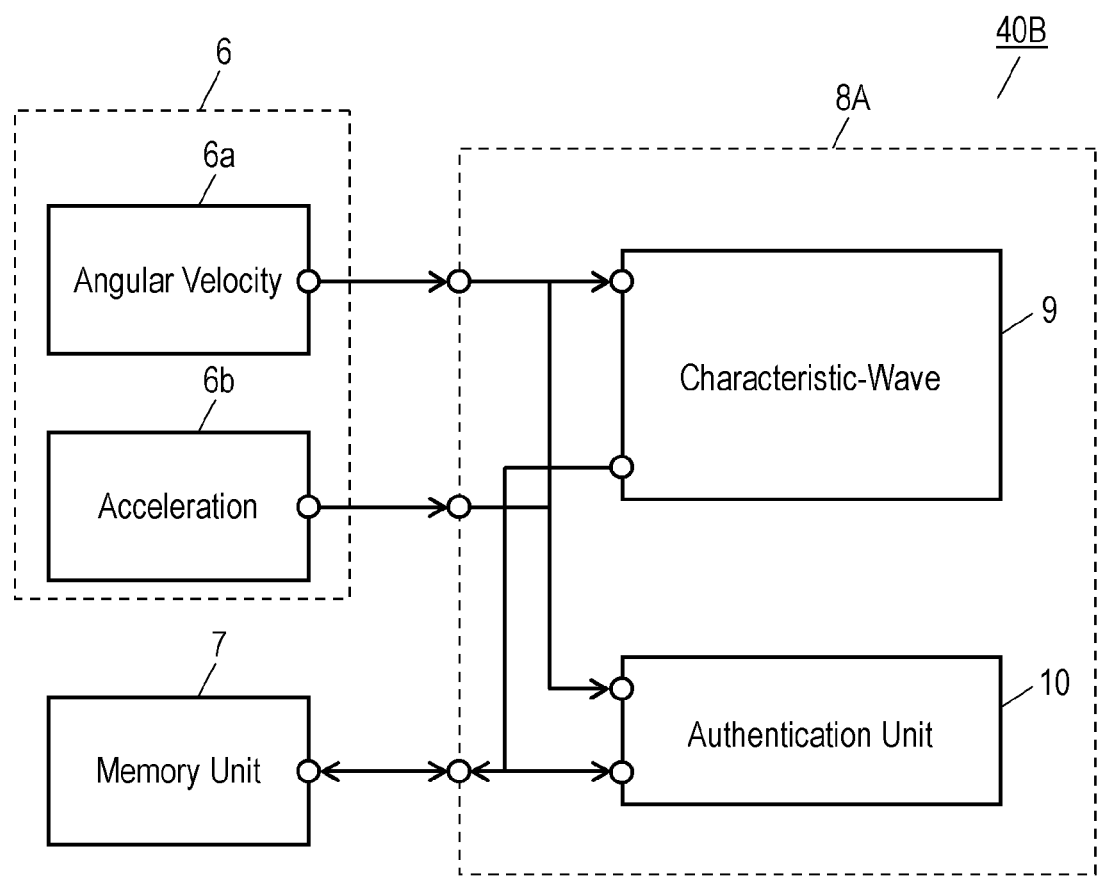
FIG. 18 is a block diagram of an electronic device according to Exemplary Embodiment 6.

FIG. 18 is a block diagram of electronic device 40B according to Exemplary Embodiment 6. In FIG. 18, components identical to those of electronic device 40 according to Embodiment 3 shown in FIG. 11 are denoted by the same reference numerals. When a user holding electronic device 40B performs an action, such as walking, going upstairs, electronic device 40B receives various inertial forces, such as accelerations and angular velocities. An action pattern of the action produces a certain pattern of inertial forces. When a user performs a predetermined action, characteristic-waveform processor 9 calculates a characteristic waveform corresponding to the action based on a waveform output from inertial force sensor 6 and records the characteristic waveform in memory unit 7. Concretely, characteristic-waveform processor 9 calculates plural characteristic waveforms corresponding to predetermined actions performed by the user and records the characteristic waveforms in memory unit 7. Authenticator 10 calculates a reference waveform based on waveforms output from inertial force sensor 6 caused by a certain action currently performed by the user and selects a characteristic waveform out of the characteristic waveforms similar to the reference waveform. Thus, authenticator 10 determines that the user performs one of the predetermined actions corresponding to the selected characteristic waveform.

Figure 20A:
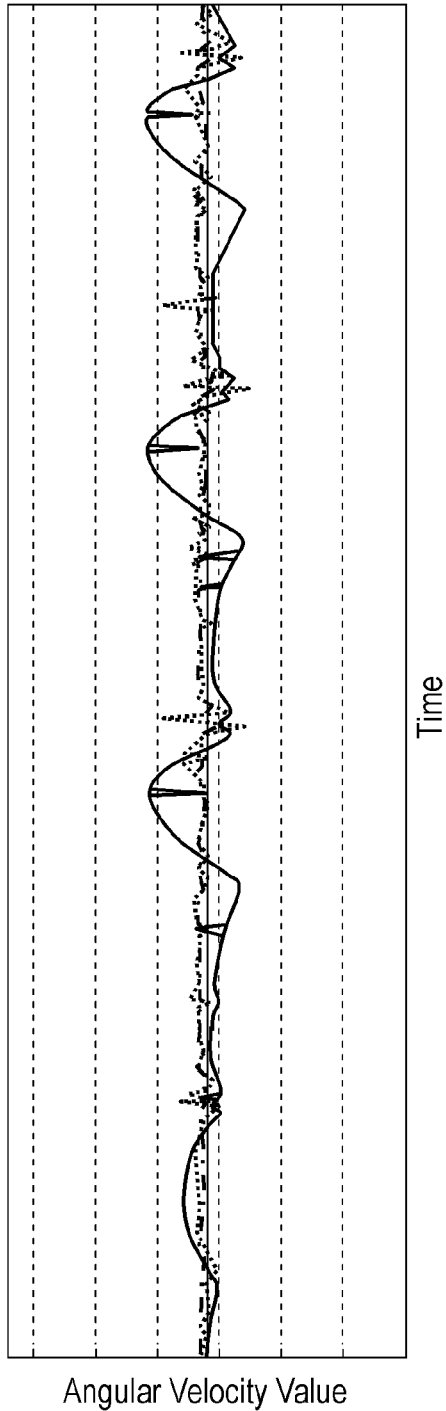
FIG. 20A shows output waveforms of the inertial force sensor of the electronic device according to Embodiment 6.
Figure 20B:
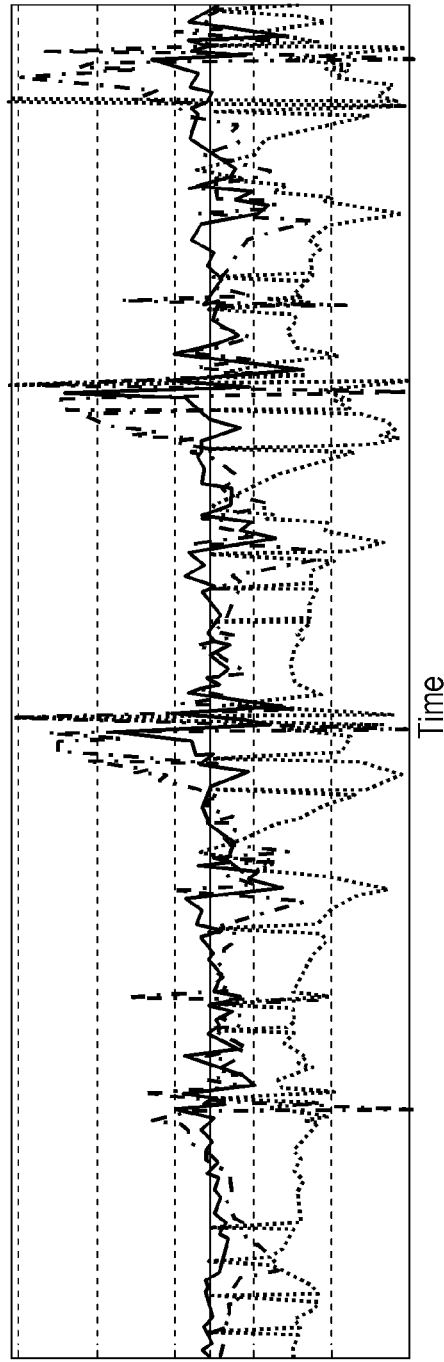
FIG. 20B shows output waveforms of the inertial force sensor of the electronic device according to Embodiment 6.
Figure 21A:
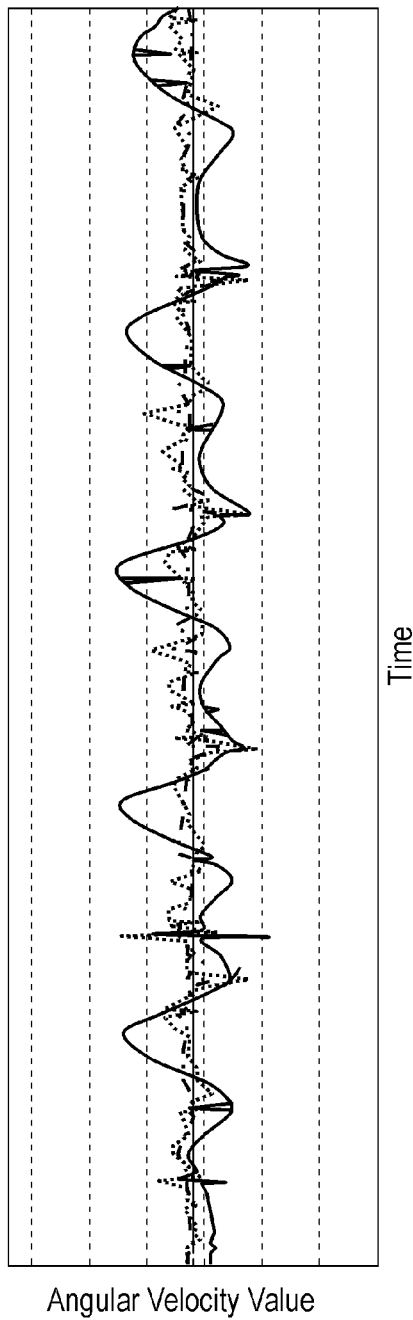
FIG. 21A shows output waveforms of the inertial force sensor of the electronic device according to Embodiment 6.
Figure 21B:
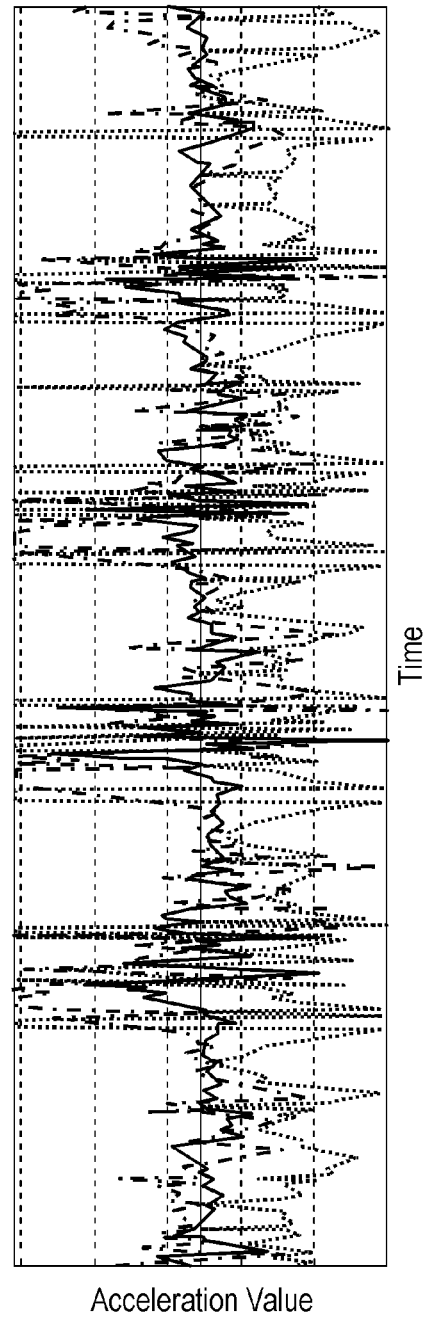
FIG. 21B shows output waveforms of the inertial force sensor of the electronic device according to Embodiment 6.
Figure 22A:
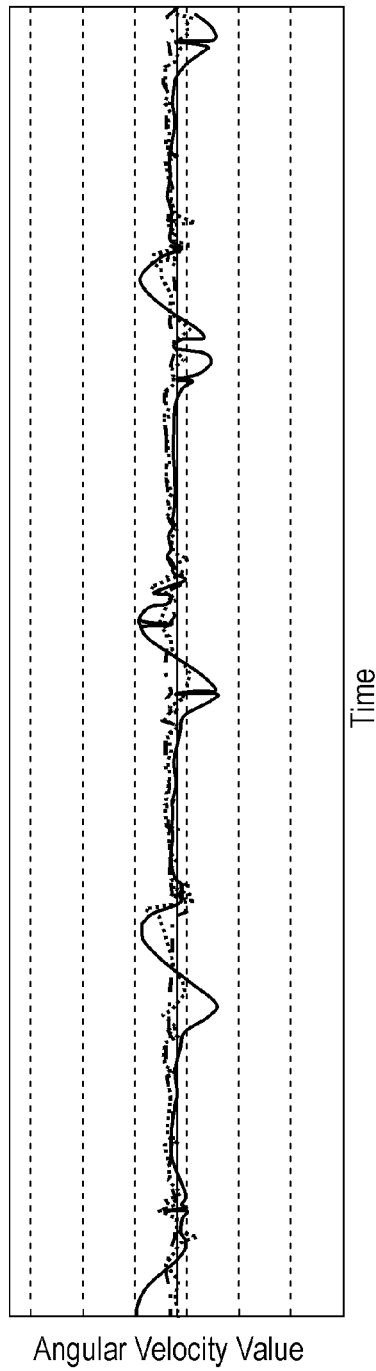
FIG. 22A shows output waveforms of the inertial force sensor of the electronic device according to Embodiment 6.
Figure 22B:
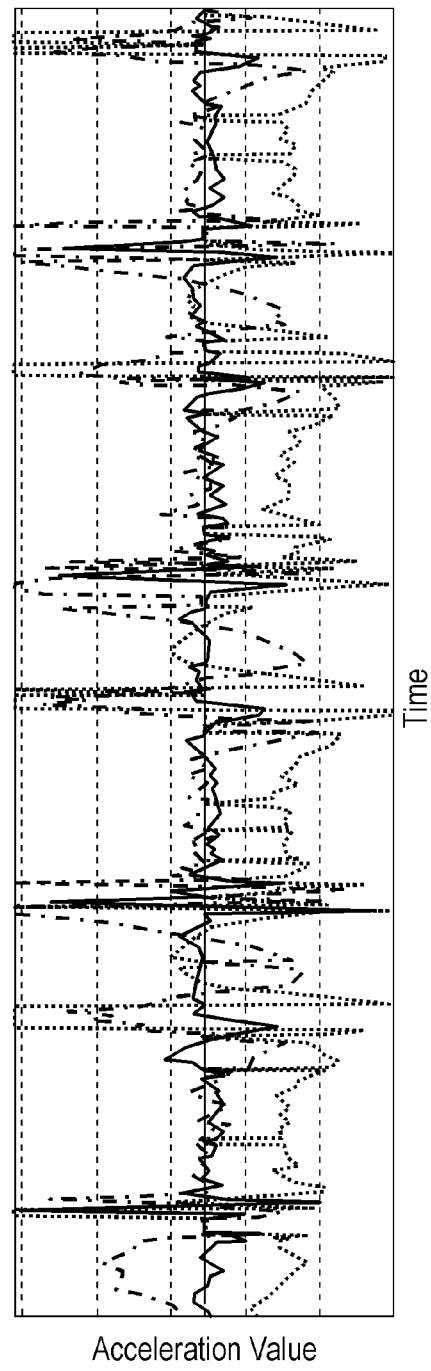
FIG. 22B shows output waveforms of the inertial force sensor of the electronic device according to Embodiment 6.
Figure 23:
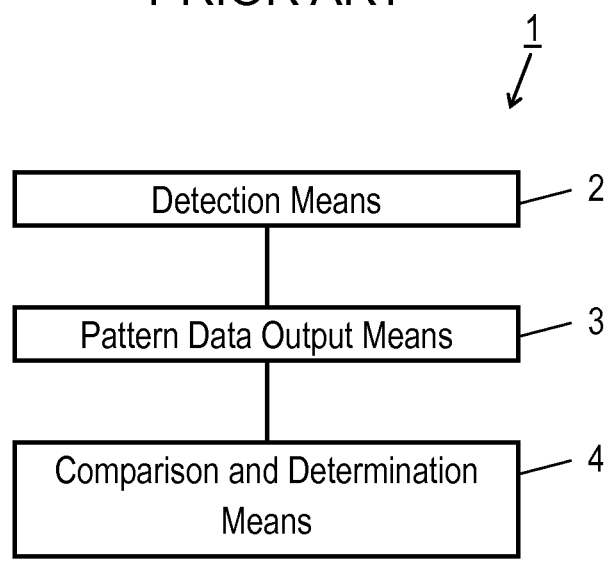
FIG. 23 is a block diagram of a conventional electronic device.

FIGS. 19A and 19B show an angular velocity value and an acceleration value output from inertial force sensor 6 (i.e., angular velocity sensor 6a and acceleration sensor 6b) while the user walks slowly. FIGS. 20A and 20B show an angular velocity value and an acceleration value output from inertial force sensor 6 (i.e., angular velocity sensor 6a and acceleration sensor 6b) while the user walks fast. FIGS. 21A and 21B show an angular velocity value and an acceleration value output from inertial force sensor 6 (i.e., angular velocity sensor 6a and acceleration sensor 6b) while the user runs. FIGS. 22A and 22B show an angular velocity value and an acceleration value output from inertial force sensor 6 (i.e., angular velocity sensor 6a and acceleration sensor 6b) while the user goes upstairs. AS shown, the angular velocity values and acceleration values are different depending on an action performed by the user. Memory unit 7 records characteristic waveforms of angular velocity values and acceleration values corresponding to the actions. Authenticator 10 compares the reference waveforms of an angular velocity value and an acceleration value output from inertial force sensor 6 with the characteristic waveforms. This operation allows electronic device 40B to authenticate a user, and to determine an action performed by the user, and thus the device is applicable to various applications, such as indoor navigation.

INDUSTRIAL APPLICABILITY

An electronic device according to the present invention provides accurate authentication with a simple structure, and thus is useful as an electronic device, such as a portable phone, electronic book, and tablet type information terminal device.

REFERENCE MARKS IN THE DRAWINGS

5 Electronic Device
5A Electronic Device
6 Inertial Force Sensor
7 Memory Unit
8 Control Unit
9 Characteristic-Waveform Processor
10 Authenticator
30 Electronic Device
40 Electronic Device
40A Electronic Device

The invention claimed is:
1. An electronic device comprising:
    an inertial force sensor operable to detect a first inertial force which is an angular velocity and a second inertial force which is an acceleration;
    a memory unit; and
    a control unit connected to the inertial force sensor and the memory unit,
    wherein the control unit includes:
        a characteristic-waveform processor operable to
            generate a first characteristic waveform corresponding to the first inertial force detected by the inertial force sensor in response to a plurality of operations performed by a first user,
            generate a second characteristic waveform corresponding to the second inertial force detected by the inertial force sensor in response to the plurality of operations performed by the first user, and
            record the first characteristic waveform and the second characteristic waveform in the memory unit; and
        an authenticator operable to
            generate a first reference waveform corresponding to the first inertial force detected by the inertial force sensor in response to one or more operations performed by a second user,
            generate a second reference waveform corresponding to the second inertial force detected by the inertial force sensor in response to the one or more operations performed by the second user,
            calculate a first comparison result obtained by scaling, in time, and comparing the first reference waveform with the first characteristic waveform,
            calculate a second comparison result obtained by scaling, in time, and comparing the second reference waveform with the second characteristic waveform, and
            determine whether or not the first user and the second user are identical to each other based on the first comparison result and the second comparison result.
2. The electronic device of claim 1,
    wherein the characteristic-waveform processor is operable to:
        generate a plurality of first scaled waveforms by scaling, in time, a plurality of first output waveforms corresponding to the first inertial force;
        record a waveform obtained by averaging the plurality of first scaled waveforms in the memory unit as the first characteristic waveform;
        generate a plurality of second scaled waveforms by scaling, in time, a plurality of second output waveforms corresponding to the second inertial force; and
        record a waveform obtained by averaging the plurality of second scaled waveforms in the memory unit as the second characteristic waveform.
3. The electronic device of claim 1, wherein the authenticator is operable to scale the first and second reference waveforms and the first and second characteristic waveforms in amplitude and to compare the first and second reference waveforms with the first and second characteristic waveforms.
4. The electronic device according to claim 1,
    wherein the first inertial force is an angular velocity about a first axis, wherein the second inertial force is an acceleration along a direction of the first axis, wherein the inertial force sensor is operable to detect a third inertial force which is an angular velocity about a second axis perpendicular to the first axis and a fourth inertial force which is an acceleration along a direction of the second axis, wherein the first characteristic waveform corresponds to the first inertial force, wherein the second characteristic waveform corresponds to the second inertial force, wherein the characteristic-waveform processor is operable to generate a third characteristic waveform corresponding to the third inertial force detected by the inertial force sensor in response to the plurality of operations performed by the first user, generate a fourth characteristic waveform corresponding to the fourth inertial force detected by the inertial force sensor in response to the plurality of operations performed by the first user, and record the third characteristic waveform and the fourth characteristic waveform in the memory unit, and wherein the authenticator is operable to generate a third reference waveform corresponding to the second inertial force detected by the inertial force sensor in response to the one or more operations performed by the second user, generate the fourth second reference waveform corresponding to the fourth inertial force of the second axis detected by the inertial force sensor in response to the one or more operations performed by the second user, calculate a third comparison result obtained by comparing the third reference waveform with the third characteristic waveform, calculate a fourth comparison result obtained by comparing the fourth reference waveform with the fourth characteristic waveform, and determine whether or not the first user and the second user are identical to each other based on the first comparison result, the second comparison result, the third comparison result, and the fourth comparison result.

5. The electronic device according to claim 1 wherein the operations are completed within a predetermined duration.

6. The electronic device of claim 1, wherein the authenticator is operable to:

acquire, at predetermined time points, first difference values between the first reference waveform and the first characteristic waveform;

obtain a first cumulative deference value by cumulatively summing the first difference values acquired at the predetermined time points;

acquire, at the predetermined time points, second difference values between the second reference waveform and the second characteristic waveform;

obtain a second cumulative deference value by cumulatively summing the second difference values acquired at the predetermined time points; and determine that the first user and the second users are identical to each other if the first cumulative difference value is within a first predetermined range and the second cumulative difference value is within a second predetermined range.

7. The electronic device of claim 6, wherein the first predetermined range is different from the second predetermined range.

8. An electronic device comprising:

an inertial force sensor operable to detect a first inertial force and a second inertial force;

a memory unit; and a control unit connected to the inertial force sensor and the memory unit, wherein both of the first inertial force and the second inertial force are angular velocities or are accelerations, wherein the control unit includes:

a characteristic-waveform processor operable to generate a first characteristic waveform corresponding to the first inertial force detected by the inertial force sensor in response to a plurality of predetermined actions performed by a user, generate a second characteristic waveform corresponding to the second inertial force detected by the inertial force sensor in response to the plurality of predetermined actions performed by the user, record the first characteristic waveform and the second characteristic waveform in the memory unit; and an authenticator operable to generate a first reference waveform corresponding to the first inertial force detected by the inertial force sensor in response to a certain action performed by the user, generate a second reference waveform corresponding to the second inertial force detected by the inertial force sensor in response to the certain action performed by the user, calculate a first comparison result obtained by scaling, in time, and comparing the first reference waveform with the first characteristic waveform, calculate a second comparison result obtained by scaling, in time, and comparing the second reference waveform with the second characteristic waveform, and determine, based on the first comparison result and the first comparison result, which one of the predetermined actions the certain action is.

9. The electronic device according to claim 8, wherein the first inertial force is an acceleration in a direction of a first axis, and wherein the second inertial force is an acceleration in a direction of a second axis which is not parallel to the first axis.

10. The electronic device according to claim 8, wherein the first inertial force is an angular velocity about a first axis, and wherein the second inertial force is an angular velocity about a second axis which is not parallel to the first axis.

11. An electronic device comprising:

an inertial force sensor operable to detect a first inertial force which is an acceleration and a second inertial force which is an angular velocity;

a memory unit; and a control unit connected to the inertial force sensor and the memory unit, wherein the control unit includes:

a characteristic-waveform processor operable to generate a first characteristic waveform corresponding to the first inertial force detected by the inertial force sensor in response to a plurality of predetermined actions performed by a user, generate a second characteristic waveform corresponding to the second inertial force detected by the inertial force sensor in response to the plurality of predetermined actions performed by the user, record the first characteristic waveform and the second characteristic waveform in the memory unit; and an authenticator operable to generate a first reference waveform corresponding to the first inertial force detected by the inertial force sensor in response to a certain action performed by the user, generate a second reference waveform corresponding to the second inertial force detected by the inertial force sensor in response to the certain action performed by the user, calculate a first comparison result obtained by scaling, in time, and comparing the first reference waveform with the first characteristic waveform, calculate a second comparison result obtained by scaling, in time, and comparing the second reference waveform with the second characteristic waveform, and determine, based on the first comparison result and the first comparison result, which one of the predetermined actions the certain action is.

12. An electronic device comprising:

an inertial force sensor operable to detect a first inertial force and a second inertial force;

a memory unit; and a control unit connected to the inertial force sensor and the memory unit, wherein both of the first inertial force and the second inertial force are angular velocities or are accelerations, wherein the control unit includes:

a characteristic-waveform processor operable to generate a first characteristic waveform corresponding to the first inertial force detected by the inertial force sensor in response to a plurality of predetermined actions performed by a user, generate a second characteristic waveform corresponding to the second inertial force detected by the inertial force sensor in response to the plurality of predetermined actions performed by the user, record the first characteristic waveform and the second characteristic waveform in the memory unit; and an authenticator operable to generate a first reference waveform corresponding to the first inertial force detected by the inertial force sensor in response to a certain action performed by the user, generate a second reference waveform corresponding to the second inertial force detected by the inertial force sensor in response to the certain action performed by the user, calculate a first comparison result obtained by scaling, in time, and comparing the first reference waveform with the first characteristic waveform, calculate a second comparison result obtained by scaling, in time, and comparing the second reference waveform with the second characteristic waveform, and determine, based on the first comparison result and the first comparison result, which one of the predetermined actions the certain action is.

13. The electronic device according to claim 12, wherein the first inertial force is an acceleration in a direction of a first axis, and wherein the second inertial force is an acceleration in a direction of a second axis which is not parallel to the first axis.

14. The electronic device according to claim 12, wherein the first inertial force is an angular velocity about a first axis, and wherein the second inertial force is an angular velocity about a second axis which is not parallel to the first axis.

\* \* \* \* \*